United States Patent
Tsuruma et al.

(10) Patent No.: US 9,978,321 B2
(45) Date of Patent: May 22, 2018

(54) DISPLAY DEVICE AND METHOD OF DRIVING THE SAME

(71) Applicant: Japan Display Inc., Minato-ku (JP)

(72) Inventors: Takeyuki Tsuruma, Tokyo (JP); Akira Sakaigawa, Tokyo (JP); Masaaki Kabe, Tokyo (JP); Kojiro Ikeda, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days. days.

(21) Appl. No.: 15/221,768

(22) Filed: Jul. 28, 2016

(65) Prior Publication Data

US 2017/0047026 A1 Feb. 16, 2017

(30) Foreign Application Priority Data

Aug. 10, 2015 (JP) .................................. 2015-158188

(51) Int. Cl.
*G09G 3/36* (2006.01)
*G02F 1/13* (2006.01)

(52) U.S. Cl.
CPC ............. *G09G 3/3607* (2013.01); *G02F 1/13* (2013.01); *G09G 3/3648* (2013.01); *G09G 2300/0452* (2013.01); *G09G 2300/0465* (2013.01)

(58) Field of Classification Search
CPC .......................... G09G 3/3607; G09G 3/3648
See application file for complete search history.

(56) References Cited

U.S. PATENT DOCUMENTS

| | | |
|---|---|---|
| 2003/0128179 A1 | 7/2003 | Credelle |
| 2003/0128225 A1 | 7/2003 | Credelle et al. |
| 2004/0051724 A1 | 3/2004 | Elliott et al. |
| 2004/0080479 A1 | 4/2004 | Credelle |
| 2005/0225574 A1 | 10/2005 | Brown Elliott et al. |
| 2005/0225575 A1 | 10/2005 | Brown Elliott et al. |
| 2005/0270444 A1* | 12/2005 | Miller .................. G09G 3/3216 349/108 |
| 2007/0052887 A1 | 3/2007 | Brown Elliot et al. |
| 2007/0057963 A1 | 3/2007 | Brown Elliott et al. |
| 2007/0064020 A1 | 3/2007 | Credelle et al. |
| 2008/0297541 A1 | 12/2008 | Credelle |
| 2010/0164978 A1 | 7/2010 | Brown Elliott et al. |
| 2012/0176428 A1 | 7/2012 | Credelle |
| 2014/0043357 A1 | 2/2014 | Yamato et al. |

FOREIGN PATENT DOCUMENTS

JP 4918028 4/2012
WO WO 2012/137819 A1 10/2012

* cited by examiner

*Primary Examiner* — Kevin M Nguyen
(74) *Attorney, Agent, or Firm* — Oblon, McClelland, Maier & Neustadt, L.L.P.

(57) ABSTRACT

According to one embodiment, a display device includes signal lines, scanning lines, a first pixel, a second pixel and a third pixel. The first pixel including a first subpixel which displays a first color, a second subpixel which displays white, and a third subpixel which displays a second color. The second pixel including a fourth subpixel which displays a third color, a fifth subpixel which displays white, and a sixth subpixel which displays the first color. The third pixel including a seventh subpixel which displays the second color, an eighth subpixel which displays white, and a ninth subpixel which displays the third color.

12 Claims, 14 Drawing Sheets

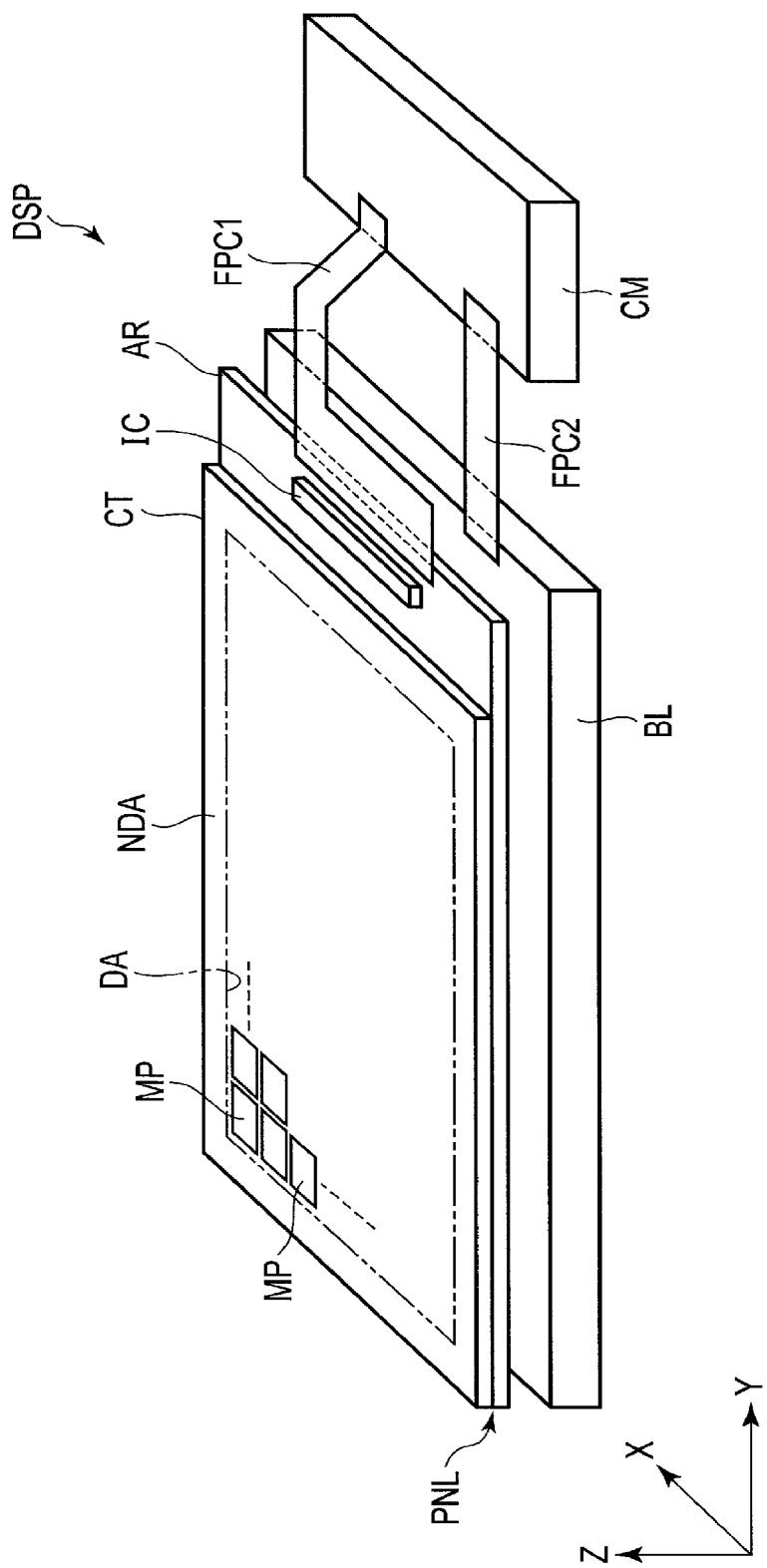
F I G. 1

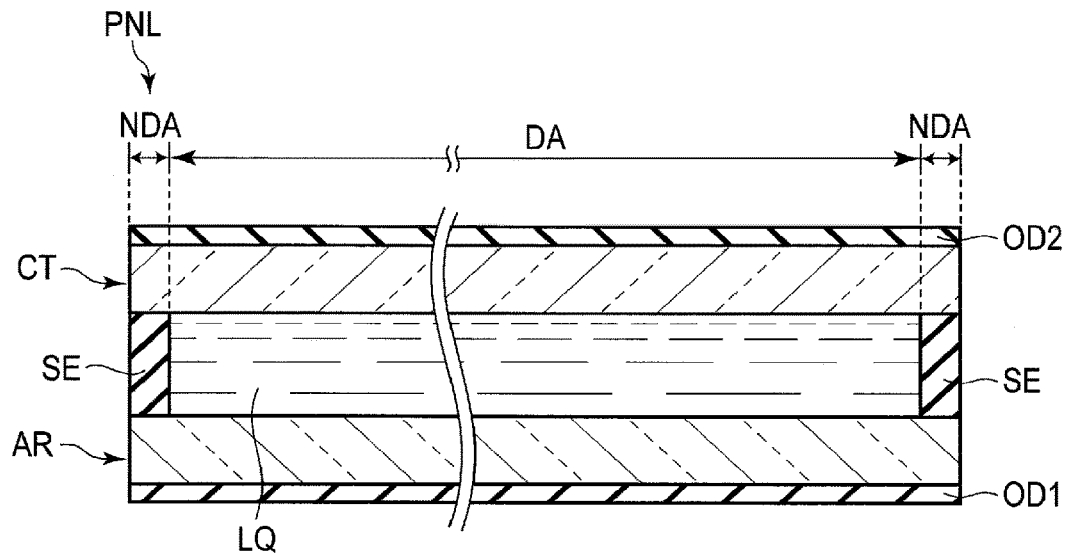
F I G. 2
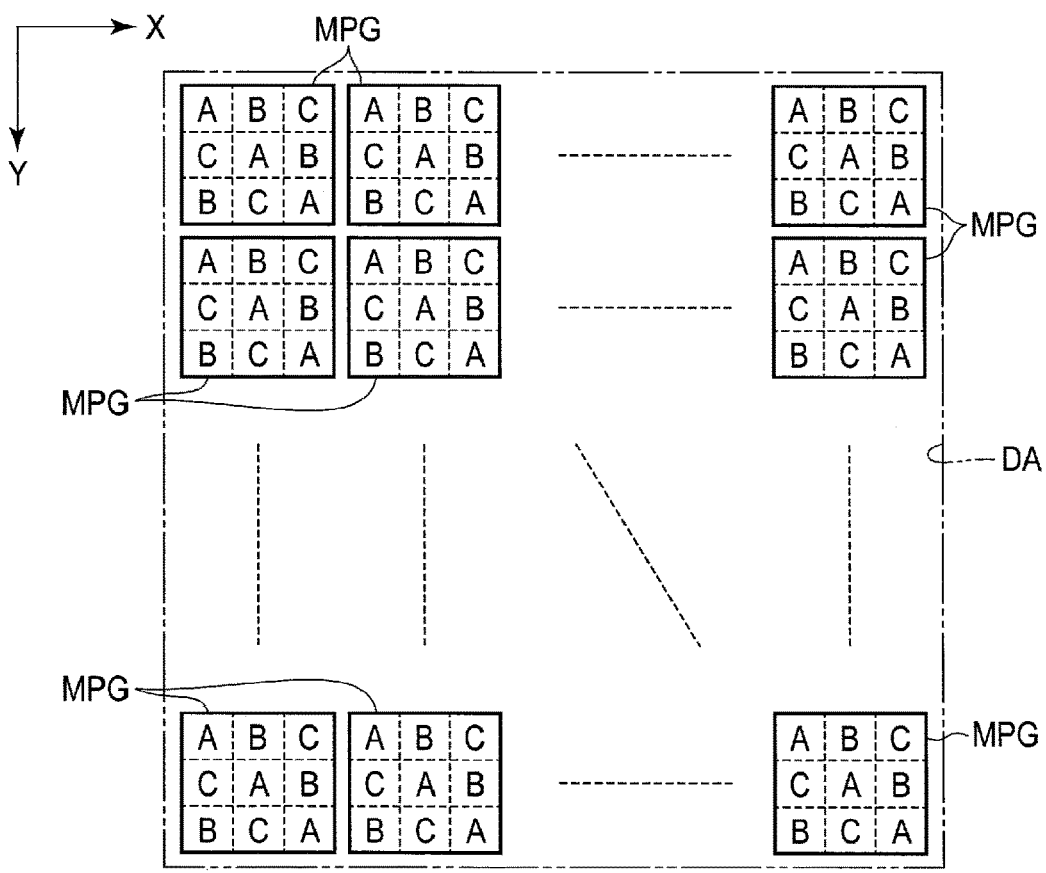
F I G. 3

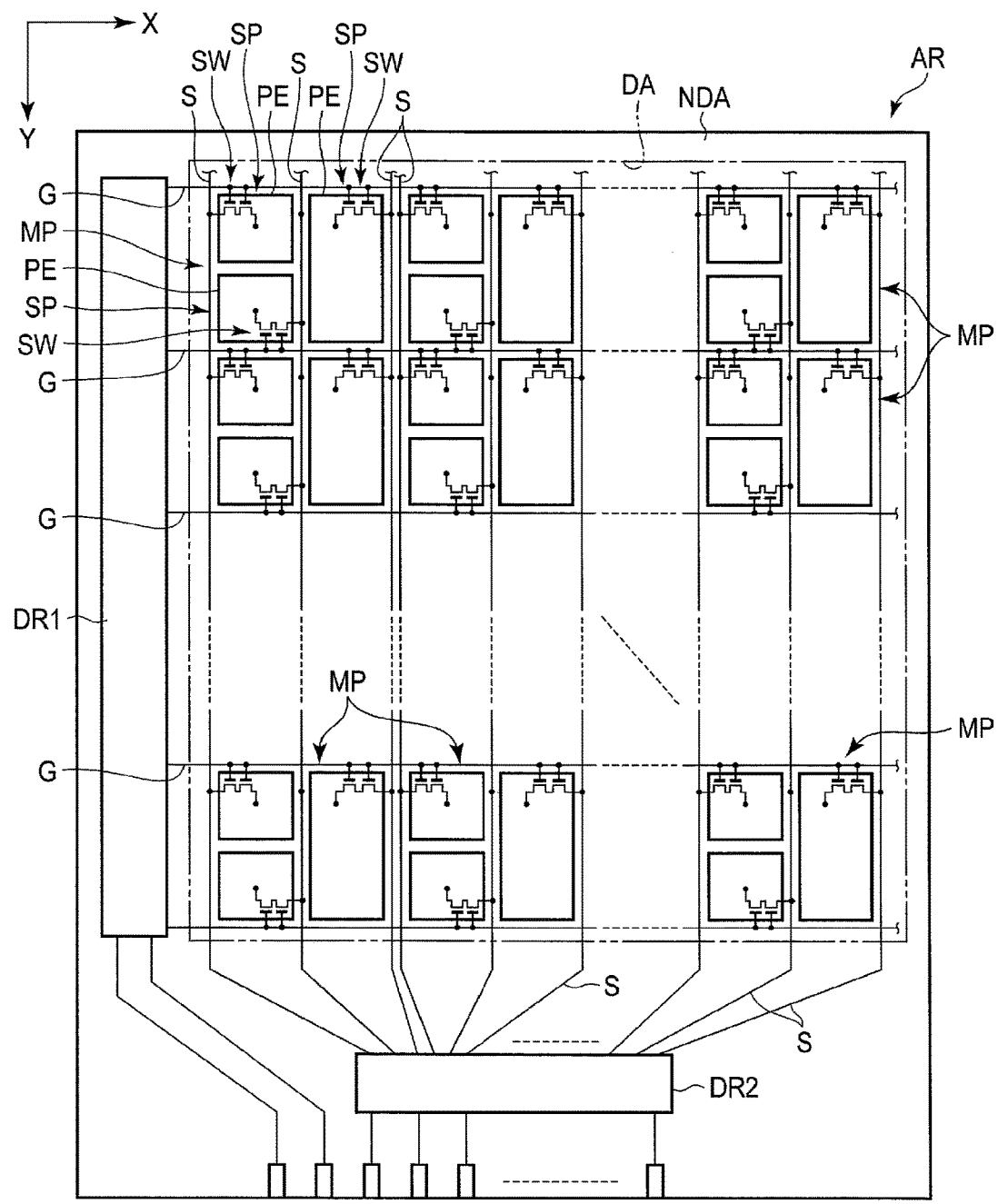
F I G. 5

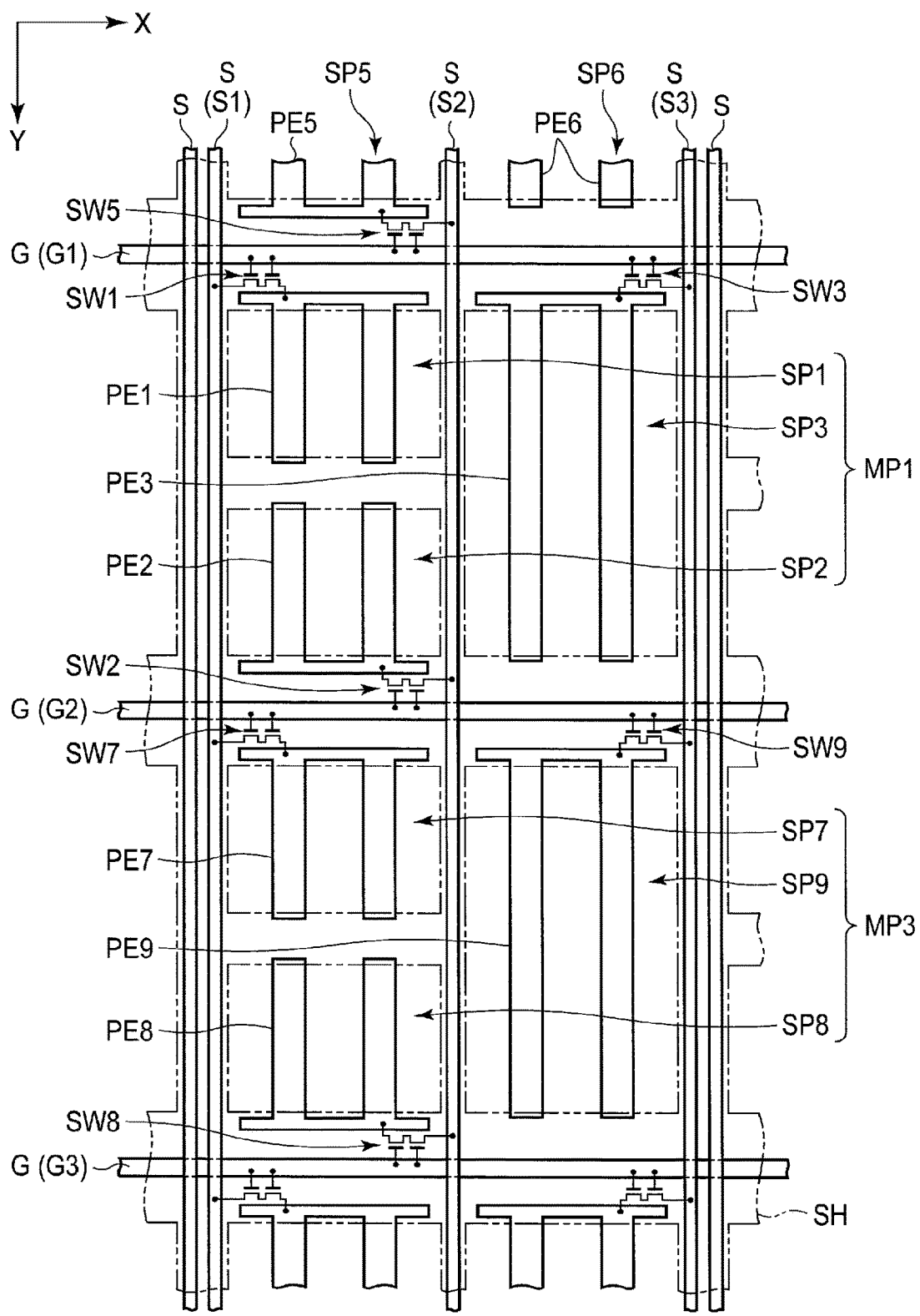
F I G. 6

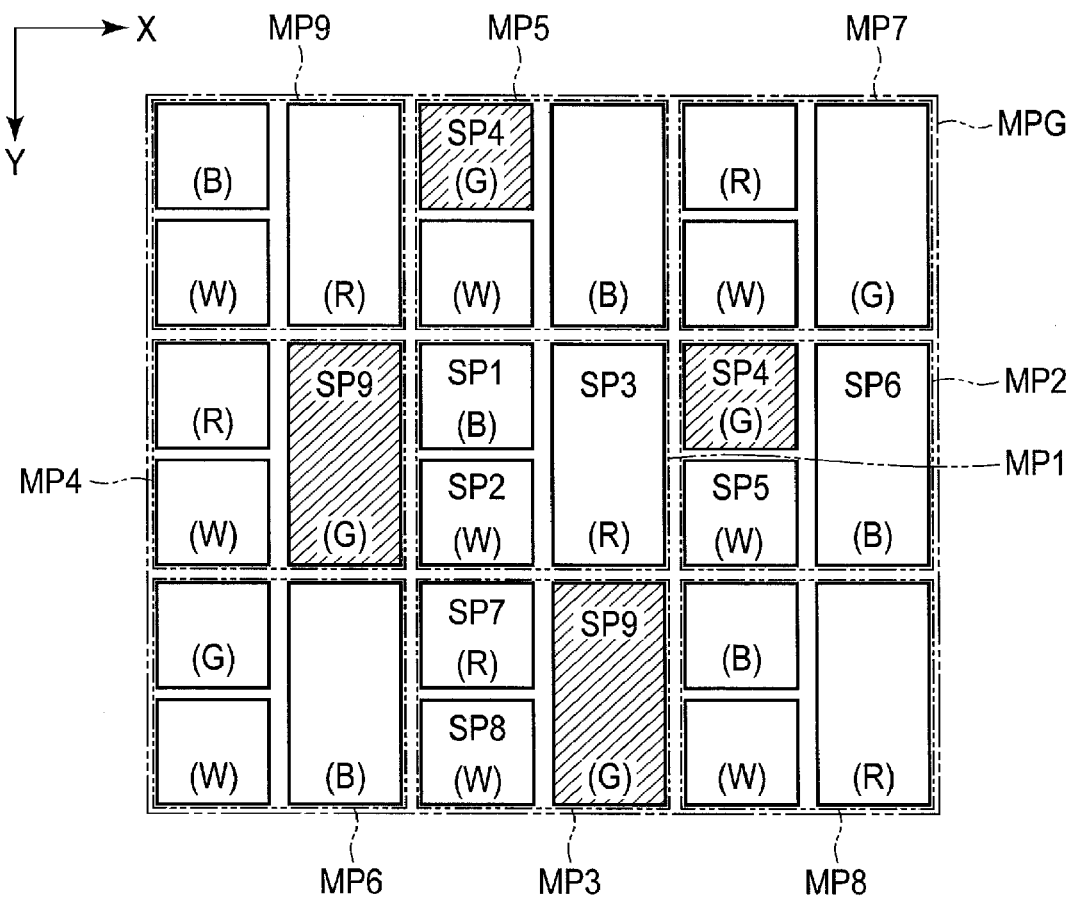
F I G. 10

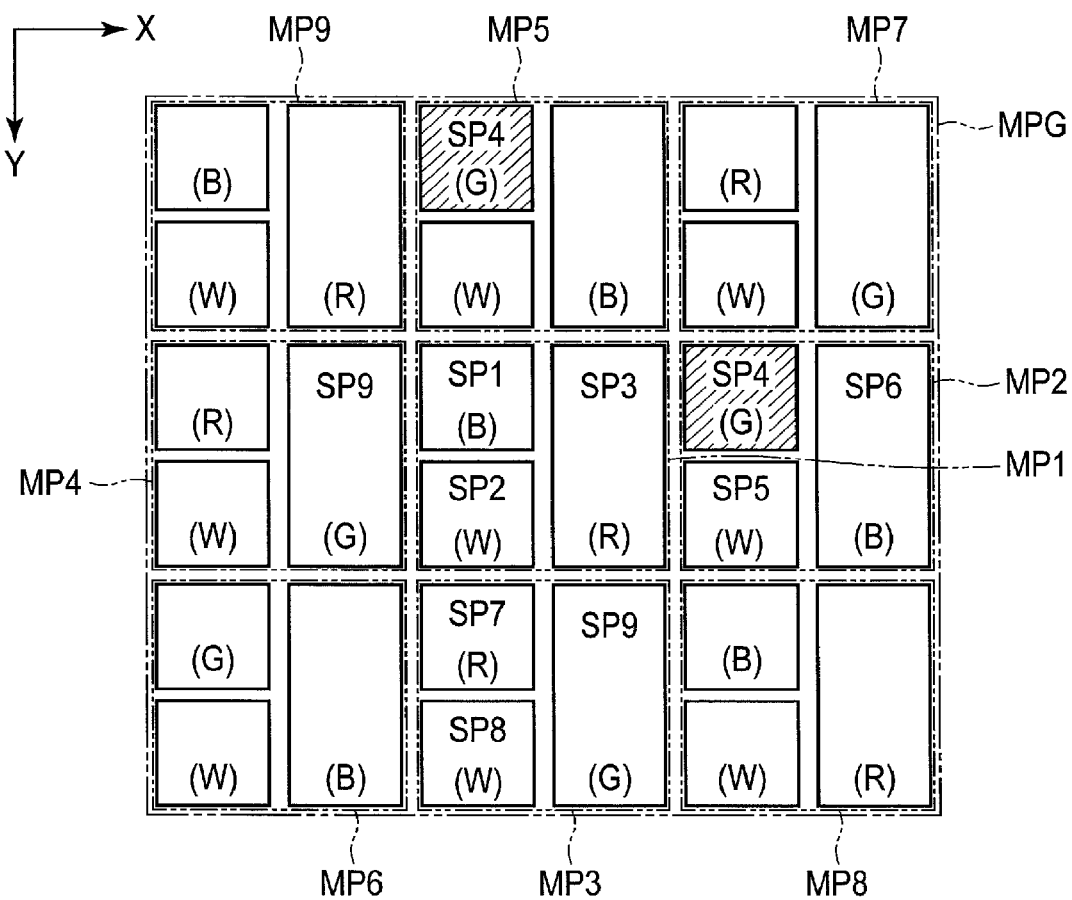
F I G. 11

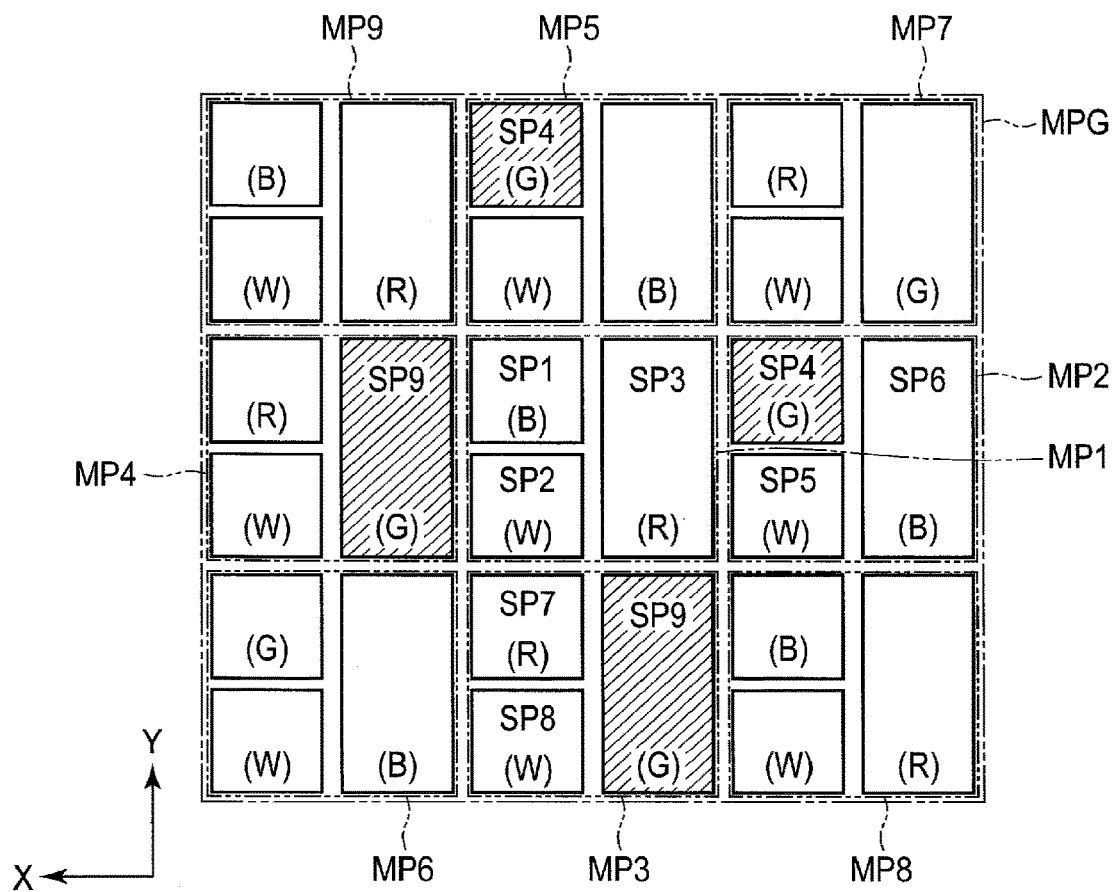
F I G. 15

DISPLAY DEVICE AND METHOD OF DRIVING THE SAME

CROSS-REFERENCE TO RELATED APPLICATIONS

This application is based upon and claims the benefit of priority from Japanese Patent Application No. 2015-158188, filed Aug. 10, 2015, the entire contents of which are incorporated herein by reference.

FIELD

Embodiments described herein relate generally to a display device and a method of driving the same.

BACKGROUND

In recent years, display devices to be incorporated in smartphones or tablets have been required to have a higher resolution and a higher aperture ratio. If the resolution is made higher, and as a result a pixel size is reduced, the ratio of a signal line and a light-shielding layer to a pixel area is increased, and the aperture ratio is thus reduced. Furthermore, since it is necessary to restrict occurrence of color mixing, it is difficult to reduce the ratio of the signal line and the light-shielding layer to the pixel area.

As an example of a technique for ensuring a sufficient aperture ratio while achieving a higher resolution, it is known that a pixel is made up of two subpixels, i.e., a red subpixel and a green subpixel or a blue subpixel and a white subpixel.

BRIEF DESCRIPTION OF THE DRAWINGS

FIG. 1 is a perspective view illustrating a structure of a liquid crystal display device according to a first embodiment.

FIG. 2 is a cross-sectional view illustrating a liquid crystal display panel as illustrated in FIG. 1.

FIG. 3 is a view illustrating an example of arrangement of a plurality of pixel groups in a display area of the above liquid crystal display panel.

FIG. 5 is a plan view illustrating a configuration of an array substrate as illustrated in FIGS. 1 and 2.

FIG. 6 is a configuration view illustrating two pixels in the above liquid crystal display panel, and also a relationship in electrical connection between scanning lines, signal lines, switching elements and pixel electrodes.

FIG. 10 is a view for explaining a driving method of the liquid crystal display device according to the first embodiment, and also a plan view illustrating a single pixel group.

FIG. 11 is a view for explaining a driving method of a liquid crystal display device according to a second embodiment, and also a plan view illustrating a single pixel group.

FIG. 15 is a view illustrating a modification of the liquid crystal display device according to the first embodiment, and also a plan view illustrating a single pixel group.

DETAILED DESCRIPTION

Figure 4:
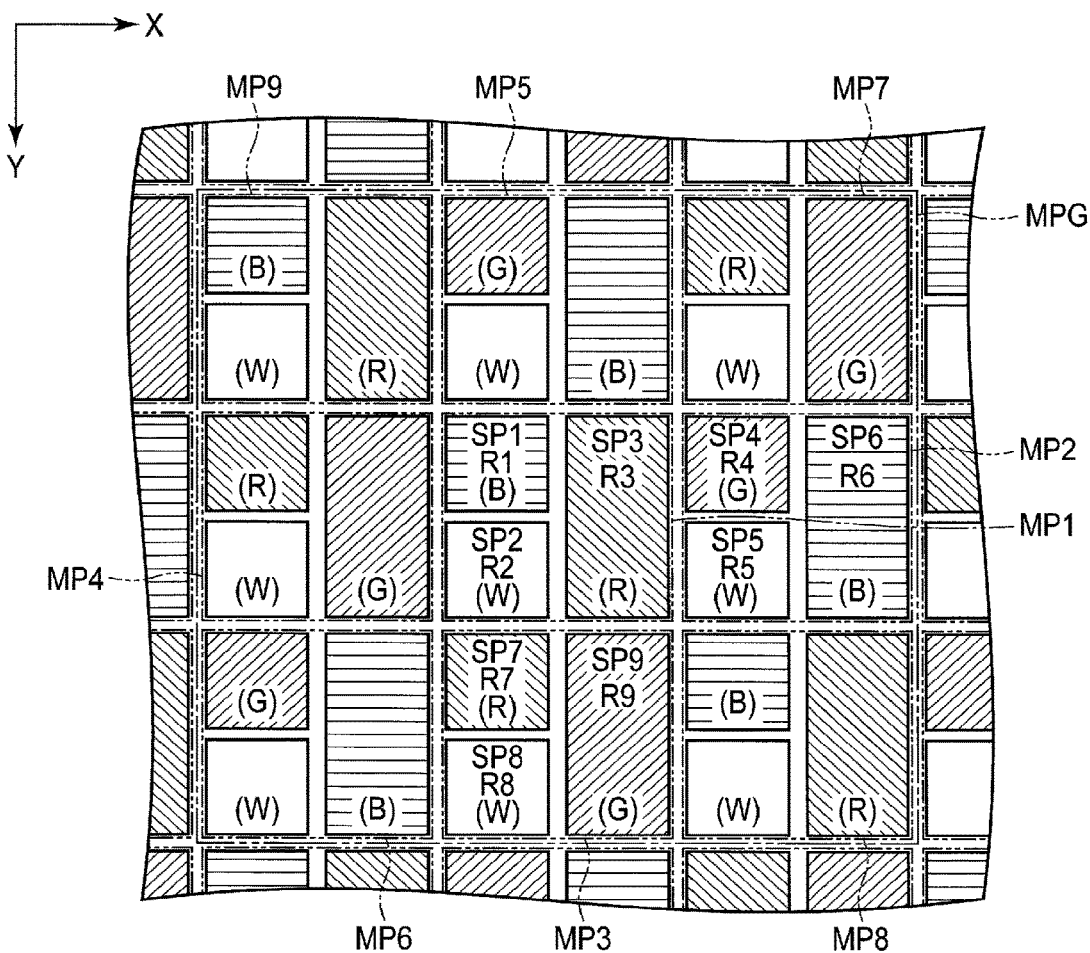
FIG. 4 is a view illustrating part of the above plurality of pixel groups, and also an example of arrangement of a plurality of pixels in the pixel groups.

In general, according to one embodiment, there is provided a display device comprising: a plurality of signal lines arranged in a first direction; a plurality of scanning lines arranged in a second direction crossing the first direction; a first pixel including a first subpixel, a second subpixel and a third subpixel, the first subpixel including a first region which displays a first color different from white, the second subpixel including a second region which displays white, the second subpixel being located forward of the first subpixel in the second direction and adjacent to the first subpixel, the third subpixel including a third region which displays a second color different from white and the first color, the third subpixel being located forward of the first subpixel and the second subpixel in the first direction and adjacent to the first and second subpixels; a second pixel including a fourth subpixel, a fifth subpixel and a sixth subpixel, the fourth subpixel including a fourth region which displays a third color different from white, the first color and the second color, the fifth subpixel including a fifth region which displays white, the fifth subpixel being located forward of the fourth subpixel in the second direction and adjacent to the fourth subpixel, the sixth subpixel including a sixth region which displays the first color, the sixth subpixel being located forward the fourth subpixel and the fifth subpixel in the first direction and adjacent to the fourth subpixel and the fifth subpixel, the second pixel being adjacent to the first pixel on a side of the first pixel; and a third pixel including a seventh subpixel, an eighth subpixel and a ninth subpixel, the seventh subpixel including a seventh region which displays the second color, the eighth subpixel including an eighth region which displays white, the eighth subpixel being located forward of the seventh subpixel in the second direction and adjacent to the seventh subpixel, the ninth subpixel including a ninth region which displays the third color, the ninth subpixel being located forward of the seventh subpixel and the eighth subpixel in the first direction and adjacent to toe the seventh and eighth subpixels, the third pixel being adjacent to the first pixel on another side of the first pixel.

According to another embodiment, there is provided a display device which comprises pixels arranged in a matrix, each of the pixels comprising a first subpixel, a second subpixel and a third subpixel which has a greater area than an area of each of the first and second subpixels. The display device comprises a first pixel in which a first subpixel is a subpixel which displays white, a second subpixel is a subpixel which displays a first color different from white, and a third subpixel is a subpixel with displays a second color different from white and the first color; and a second pixel in which a first subpixel is a subpixel which displays white, a second subpixel is a subpixel which displays the second color, and a third pixel is a subpixel which displays a third color different from white and the first and second colors, the second pixel being located adjacent to the first pixel.

According to another embodiment, there is provided a method of driving a display device which comprising: a plurality of signal lines arranged in a first direction; a plurality of scanning lines arranged in a second direction crossing the first direction; a first pixel including a first subpixel, a second subpixel and a third subpixel, the first subpixel including a first region which displays a first color different from white, the second subpixel including a second region which displays white, the second subpixel being located forward of the first subpixel in the second direction and adjacent to the first subpixel, the third subpixel including a third region which displays a second color different from white and the first color, the third subpixel being located forward of the first subpixel and the second subpixel in the first direction and adjacent to the first and second subpixels; a second pixel including a fourth subpixel, a fifth subpixel and a sixth subpixel, the fourth subpixel including a fourth region which displays a third color different from white, the first color and the second color, the fifth subpixel including a fifth region which displays white, the fifth subpixel being located forward of the fourth subpixel in the second direction and adjacent to the fourth subpixel, the sixth subpixel including a sixth region which displays the first color, the sixth subpixel being located forward the fourth subpixel and the fifth subpixel in the first direction and adjacent to the fourth subpixel and the fifth subpixel, the second pixel being adjacent to the first pixel on a side of the first pixel; and a third pixel including a seventh subpixel, an eighth subpixel and a ninth subpixel, the seventh subpixel including a seventh region which displays the second color, the eighth subpixel including an eighth region which displays white, the eighth subpixel being located forward of the seventh subpixel in the second direction and adjacent to the seventh subpixel, the ninth subpixel including a ninth region which displays the third color, the ninth subpixel being located forward of the seventh subpixel and the eighth subpixel in the first direction and adjacent to toe the seventh and eighth subpixels, the third pixel being adjacent to the first pixel on another side of the first pixel. The method comprises driving the signal lines and the scanning lines, and supplying image signals to the first to ninth subpixels of the first to third pixels through the signal lines, and adjusting, in a case where a color display made by the first pixel is short in the third color, a voltage of an image signal to be supplied to a to-be-assigned subpixel or subpixels which are one or two subpixels which display the third color, and are included in the second and third pixels, and assigning a display of the third color in which the color display is short to the to-be-assigned subpixel or subpixels.

Embodiments and modifications will be described hereinafter with reference to the accompanying drawings. The disclosure is a mere example, and arbitrary change of gist which can be easily conceived by a person of ordinary skill in the art naturally falls within the inventive scope. To better clarify the explanations, the drawings may pictorially show width, thickness, shape, etc., of each portion as compared with an actual aspect, but they are mere examples and do not restrict the interpretation of the invention. In the present specification and drawings, after structural elements are each explained once with reference to the drawings, there is a case where their explanations will be omitted as appropriate, and those identical to or similar to the explained structural elements will be denoted by the same reference numbers, respectively, as the explained structural elements.

First Embodiment

A display device and a driving method of the display device according to a first embodiment will be described in detail.

With respect to the first embodiment, as an example of the display device, a liquid crystal display device will be described. The liquid crystal display device can be used in various devices such as a smartphone, a tablet terminal, a mobile phone terminal, a personal computer, a television receiver, an in-car device, and a game console. A major configuration which will be explained below with respect to the first embodiment can also be applied to a self-luminous display device comprising an organic electroluminescent display element, etc., an electronic paper display device comprising a cataphoretic element, etc., a display device employing micro-electro-mechanical systems (MEMS), or a display device to which electrochromism is applied.

FIG. 1 is a perspective view illustrating a structure of a liquid crystal display device DSP. In the first embodiment, a first direction X and a second direction Y are perpendicular to each other, but may cross each other at an angle other than 90°. A third direction Z is perpendicular to the first direction X and the second direction Y. These directions are directions indicated by arrows in the drawings, and directions which the arrows are reversed by 180° to indicate will be referred to as opposite directions.

The liquid crystal display device DSP comprises an active matrix liquid crystal display panel PNL, a driving IC chip IC which drives the liquid crystal display panel PNL, a backlight unit BL which illuminates the liquid crystal display panel PNL, a control module CM, flexible printed circuits FPC1 and FPC2, etc.

The liquid crystal display panel PNL includes an array substrate AR and a counter-substrate CT provided opposite to the array substrate AR. The liquid crystal display panel PNL includes a display area DA which displays an image and a non-display area NDA which is formed in the shape of a frame surrounding the display area DA. The liquid crystal display panel PNL comprises a plurality of main pixels arranged in a matrix in the first direction X and the second direction Y in the display area DA. In the following, the main pixels are referred to as pixels MP. A main pixel MP corresponds to a group of three subpixels to be described later.

The backlight unit BL is provided on a rear surface of the array substrate AR. As the structure of the backlight unit BL, various structures can be applied. However, a detailed explanation of the structure of the backlight unit BL will be omitted. The driving IC chip IC is mounted on the array substrate AR. The flexible printed circuit FPC1 connects the liquid crystal display panel PNL and the control module CM to each other. The flexible printed circuit FPC2 connects the backlight unit BL and the control module CM to each other.

The liquid crystal display device DSP having such a structure corresponds to a transmissive liquid crystal display device in which subpixels are selectively caused to transmit light incident from the backlight unit BL onto the liquid crystal display panel PNL, thereby displaying an image. However, the liquid crystal display device DSP may be a reflective liquid crystal display device in which subpixels are selectively caused to reflect external light incident from the outside onto the liquid crystal display panel PNL, thereby displaying an image, or it may be a semi-transmissive liquid crystal display device having both transmissive and reflective functions.

FIG. 2 is a cross-sectional view illustrating the liquid crystal display panel PNL.

As illustrated in FIG. 2, the liquid crystal display panel PNL includes an array substrate AR, a counter-substrate CT, a liquid crystal layer LQ, a sealing member SE, a first optical element OD1, a second optical element OD2, etc. The array substrate AR and the counter-substrate CT will be explained in detail later.

The sealing member SE is disposed in the non-display area NDA to attach the array substrate AR and the counter-substrate CT to each other. The liquid crystal layer LQ is held between the array substrate AR and the counter-substrate CT. The first optical element OD1 and the liquid crystal layer LQ are located on opposite sides of the array substrate AR, respectively; that is, they are located opposite to each other with respect to the array substrate AR. The second optical element OD2 and the liquid crystal layer LQ are located on opposite sides of the counter-substrate CT, respectively; that is, they are located opposite to each other with respect to the counter-substrate CT. Each of the first optical element OD1 and the second optical element OD2 comprises a polarizer. It should be noted that each of the first optical element OD1 and the second optical element OD2 may includes another or other optical elements such as a retardation film.

FIG. 3 is a view showing an example of arrangement of groups of main pixels in the display area DA in the liquid crystal display panel PNL. In the following, a group of main pixels is referred to as a pixel group MPG.

As illustrated in FIG. 3, the liquid crystal display panel PNL comprises a plurality of pixel groups MPG. The pixel groups MPG are arranged in a matrix in the first and second directions X and Y in the display area DA. The pixel groups MPG each include 9 pixels, and are formed in the same manner. In the example illustrated in FIG. 3, each of the pixel groups MPG includes three kinds of pixels; a first kind of pixels A, a second kind of pixels B and a third kind of pixels C. To be more specific, in each of the pixel groups MPG, a first kind of three pixels A, a second kind of three pixels B and a third kind of three pixels C are arranged in the same manner as in the other pixel groups MPG. The configuration of the first to third kinds of pixels A to C will be described later.

Specifically, in the first direction X, a first kind of pixel A, a second kind of pixel B and a third kind of pixel C are arranged in this order, and this arrangement is subsequently repeated. In the second direction Y, a first kind of pixel A, a third kind of pixel C and a second kind of pixel B are arranged in this order, and this arrangement is subsequently repeated. Furthermore, in the arrangement of the first to third kinds of pixels A to C, the kinds of any adjacent two pixels in the first direction X are different from each other; and likewise, the kinds of any adjacent two pixels in the second direction Y are different from each other.

FIG. 4 is a view illustrating part of a plurality of pixel groups MPG and an example of arrangement of a plurality of pixels MP in the pixel groups MPG.

As illustrated in FIG. 4, each of nine pixels MP in a pixel group MPG comprises three subpixels SP. To be more specific, each of the pixels MP comprises three colored pixels SP, i.e., a white subpixel SP and any two of a subpixel SP having a first color, a subpixel SP having a second color and a subpixel SP having a third color. It should be noted that the first to third colors are different colors other than white. In the first embodiment, the first color is blue, the second color is red, and the third color is green.

However, the above pattern of the first to third colors is described to by way of example, and can be variously modified. It suffices that one of the first to third colors is red, one of the other two is green, and the other is blue. Furthermore, the combination of the first to third colors is not limited to a combination of red, green and blue.

As can be seen from above, the pixels MP are pseudo-pixels. That is, a single pixel MP cannot produce every color display. In light of this point, in the first embodiment, in the case of producing a color display containing a color which an arbitrary single pixel MP does not have, a display of the color can be assigned to a single or two pixels MP adjacent to the arbitrary single pixel MP. In this case, the adjacent single or two pixels MP have the color which the above arbitrary single pixel MP does not have. The arbitrary single pixel MP and the adjacent single or two pixels MP can produce the above color display in combination, which cannot be produced by the above arbitrary single pixel MP solely.

Each of the pixel groups MPG comprises a first pixel MP1, a second pixel MP2, a third pixel MP3, a fourth pixel MP4, a fifth pixel MP5, a sixth pixel MP6, a seventh pixel MP7, an eighth pixel MP8 and a ninth pixel MP9. The first pixel MP1, the eighth pixel MP8 and the ninth pixel MP9 correspond to the above first kind of pixels A. The second pixel MP2, the fifth pixel MP5 and the sixth pixel MP6 correspond to the above second kind of pixels B. The third pixel MP3, the fourth pixel MP4 and the seventh pixel MP7 correspond to the above third kind of pixels C.

The first pixel MP1 includes a first subpixel SP1, a second subpixel SP2 and a third subpixel SP3.

The first subpixel SP1 includes a first region which displays blue (B) and a blue-colored layer.

The second subpixel SP2 has a second region R2 which displays white (W) and a transparent or faint-colored layer. Thus, there can be a case where preferably, the colored layer of the second subpixel SP2 should be referred to as an uncolored layer. The second subpixel SP2 is located forward of the first subpixel SP1 in the second direction Y and adjacent to the first subpixel SP1.

The third subpixel SP3 includes a third region R3 which displays red (R) and a red-colored layer. The third subpixel SP3 is located forward of both the first subpixel SP1 and the second subpixel SP2 in the first direction X and adjacent to both the first subpixel SP1 and the second subpixel SP2.

The second pixel MP2 includes a fourth subpixel SP4, a fifth subpixel SP5 and a sixth subpixel SP6. The second pixel MP2 is adjacent to a side of the first pixel MP1. In the first embodiment, the second pixel MP2 is adjacent to the first pixel MP1 in the first direction X.

The fourth subpixel SP4 includes a fourth region R4 which displays green (G) and a green-colored layer.

The fifth subpixel SP5 includes a fifth region R5 which displays white (W) and a transparent or faint-colored layer or an uncolored layer. The fifth subpixel SP5 is located forward of the fourth subpixel SP4 in the second direction Y and adjacent to the fourth subpixel SP4.

The sixth subpixel SP6 includes a sixth region R6 which displays blue (B) and a blue-colored layer. The sixth subpixel SP6 is located forward of both the fourth subpixel SP4 and the fifth subpixel SP5 in the first direction X and adjacent to both the fourth subpixel SP4 and the fifth subpixel SP5.

The third pixel MP3 includes a seventh subpixel SP7, an eighth subpixel SP8 and a ninth subpixel SP9. The third pixel MP3 is adjacent to another side of the first pixel MP1 (i.e., it is adjacent to the first pixel MP1 in the second direction Y). In the first embodiment, the third pixel MP3 is adjacent to the first pixel MP1 in the second direction Y.

The seventh subpixel SP7 includes a seventh region R7 which displays red (R) and a red-colored layer.

The eighth subpixel SP8 includes an eighth region R8 which displays white (W) and a transparent or faint-colored layer or an uncolored layer. The eighth subpixel SP8 is located forward of the seventh subpixel SP7 in the second direction Y and adjacent to the seventh subpixel SP7.

The ninth subpixel SP9 includes a ninth region R9 which displays green (G) and a green-colored layer. The ninth subpixel SP9 is located forward of both the seventh subpixel SP7 and the eighth subpixel SP8 in the first direction X and adjacent to both the seventh subpixel SP7 and the eighth subpixel SP8.

The fourth pixel MP4 is formed in the same manner as the third pixel MP3. The fourth pixel MP4 includes a seventh subpixel SP7, an eighth subpixel SP8 and a ninth subpixel SP9. The fourth pixel MP4 is adjacent to a further side of the first pixel MP1. The fourth pixel MP4, the first pixel MP1 and the second pixel MP2 are arranged in the first direction X.

The fifth pixel MP5 is formed in the same manner as the second pixel MP2. The fifth pixel MP5 includes a fourth subpixel SP4, a fifth subpixel SP5 and a sixth subpixel SP6. The fifth pixel MP5 is located adjacent to still another side of the first pixel MP1. The fifth pixel MP5, the first pixel MP1 and the third pixel MP3 are arranged in the second direction Y.

The sixth pixel MP6 is formed in the same manner as the second pixel MP2. The sixth pixel MP6 includes a fourth subpixel SP4, a fifth subpixel SP5 and a sixth subpixel SP6. The sixth pixel MP6 is located adjacent to the fourth pixel MP4 at a side of the sixth pixel MP6, and also adjacent to the third pixel MP3 at another side of the sixth pixel MP6.

The seventh pixel MP7 is formed in the same manner as the third pixel MP3. The seventh pixel MP7 includes a seventh subpixel SP7, an eighth subpixel SP8 and a ninth subpixel SP9. The seventh pixel MP7 is located adjacent to the second pixel MP2 at a side of the seventh pixel MP7 and also adjacent to the fifth pixel MP5 at another side of the seventh pixel MP7.

The eighth pixel MP8 is formed in the same manner as the first pixel MP1. The eighth pixel MP8 includes a first subpixel SP1, a second subpixel SP2 and a third subpixel SP3. The eighth pixel MP8 is adjacent to the second pixel MP2 at an another side of the eighth pixel MP8 and also adjacent to the third pixel MP3 at another side of the eighth pixel MP8. The eighth pixel MP8, the third pixel MP3 and the sixth pixel MP6 are arranged in the first direction X.

The ninth pixel MP9 is formed in the same manner as the first pixel MP1. The ninth pixel MP9 includes a first subpixel SP1, a second subpixel SP2 and a third subpixel SP3. The ninth pixel MP9 is adjacent to the fourth pixel MP4 at an another side of the ninth pixel MP9 and adjacent to the fifth pixel MP5 at another side of the ninth pixel MP9. The ninth pixel MP9, the fifth pixel MP5 and the seventh pixel MP7 are arranged in the first direction X.

In the following, for example, light having a wavelength which falls within the range from 380 to 780 nm is defined as visible light. Blue is defined as a color which has a transmittance peak where it has a first wavelength which falls within the range from 380 to less than 490 nm. Green is defined as a color which has a transmittance peak where it has a second wavelength which falls within the range from 490 to less 590 nm. Red is defined as a color which has a transmittance peak where it has a third wavelength which falls within the range from 590 to 780 nm. The expression "substantially transparent" light covers visible light having a faint color, in addition to achromatic light.

In the example illustrated in FIG. 4, in each of the first pixel MP1 to the ninth pixel MP9, the first subpixel SP1, the second subpixel SP2, the fourth subpixel SP4, the fifth subpixel SP5, the seventh subpixel SP7 and the eighth subpixel SP8 have substantially the same area, i.e., a first area; and the third subpixel SP3, the sixth subpixel SP6 and the ninth subpixel SP9 have a second area which is greater than the first area. For example, the second area is substantially double the first area.

For example, the first subpixel SP1, the second subpixel SP2, the third subpixel SP3, the fourth subpixel SP4, the fifth subpixel SP5, the sixth subpixel SP6, the seventh subpixel SP7, the eighth subpixel SP8 and the ninth subpixel SP9 have substantially the same width in the first direction X. The lengths of the third subpixel SP3, the sixth subpixel SP6 and the ninth subpixel SP9 in the second direction Y are substantially double those of the first subpixel SP1, the second subpixel SP2, the fourth subpixel SP4, the fifth subpixel SP5, the seventh subpixel SP7 and the eighth subpixel SP8 in the second direction Y.

The areas of the third region R3, the sixth region R6 and the ninth region R9 are greater than those of the first region R1, the second region R2, the fourth region R4, the fifth region R5, the seventh region R7 and the eighth region R8. It should be noted that each of the first region R1 to the ninth region R9 can be restated as an opening space or a light transmission space of a subpixel SP.

The areas of the third region R3, the sixth region R6 and the ninth region R9 may be set different from each other. Also, the areas of the first region R1, the second region R2, the fourth region R4, the fifth region R5, the seventh region R7 and the eighth region R8 may be set different from each other.

Since the pixels MP are formed in the above manner, the number of subpixels SP included in each of the pixels MP is smaller than in the case where a single pixel MP is made up of a red (R) subpixel, a green (G) subpixel, a blue (B) subpixel and a white (W) subpixel, i.e., four subpixels. It is therefore possible to improve the aperture ratio of the pixels MP without reducing an effective resolution. Furthermore, the pixels MP each include a white (W) subpixel SP, and can thus improve the luminance level of a displayed image.

The above colored layers are disposed in accordance with the locations of the respective subpixels SP, and their areas depend on the sizes of the respective subpixels SP. The colored layers are arranged in a predetermined pattern. Of the colored layers of all the subpixels SP, the colored layers of smaller subpixels SP are arranged in the following manner: the blue-colored layer of a first subpixel SP1, the white-colored layer of a second subpixel SP2, the red-colored layer of a seventh subpixel SP7, the white-colored layer of an eighth subpixel SP8, the green-colored layer of a fourth subpixel SP4 and the white-colored layer of a fifth subpixel SP5 are arranged in this order in the second direction Y, and this arrangement is subsequently repeated in the second direction Y. Of the colored layers of all the subpixels SP, the colored layers of relatively large subpixels SP are arranged in the following manner: the red-colored layer of a third subpixel SP3, the green-colored layer of a ninth subpixel SP9 and a blue-colored layer of a sixth subpixel SP6 are arranged in this order in the second direction Y, and this arrangement is subsequently repeated in the second direction Y.

The colored layers of the first subpixel SP1, second subpixel SP2, fourth subpixel SP4, fifth subpixel SP5, seventh subpixel SP7 and eighth subpixel SP8 have substantially the same first area. The colored layers of the third subpixel SP3, sixth subpixel SP6 and ninth subpixel SP9 have the substantially the same second area, which is greater than the first area. For example, the second area is substantially double the first area.

The shapes of the above subpixels SP are not limited to rectangles which are elongate in the second direction Y as illustrated in FIG. 4. They may be substantially parallelogrammatic. For example, if the subpixels SP are substantially parallelogrammatic, it is possible to form a larger number of domains and compensate for a viewing-angle characteristic.

In the first embodiment, in an X-Y plane in which a fifth pixel MP5 is located on an upper side and a third pixel MP3 is located on a lower side, on the left side of each of the pixels MP, two small subpixels SP are located, and on the right side of each pixel MP, a single large subpixel SP is located. However, the locations of the sub-pixels SP have been described by way of example, and are not limited to those of the example illustrated in FIG. 4. For example, it may be set that in the above X-Y plane, on the right side of each of the pixels MP, two small subpixels SP are located, and on the left side of each pixel MP, a single large subpixel SP is located.

FIG. 5 is a plan view illustrating the configuration of the array substrate AR.

As illustrated in FIG. 5, the array substrate AR comprises scanning lines G, signal lines S, pixel electrodes PE, switching elements SW, a first drive circuit DR1, a second drive circuit DR2, etc.

In the display area DA, the scanning lines G extend in the first direction X, and are arranged and spaced from each other in the second direction Y. In the first embodiment, the scanning lines G linearly extend in the first direction X. Also, in the display area DA, the signal lines S extend in the second direction Y and intersect the scanning lines G; and are arranged and spaced from each other in the first direction X. The signal lines S do not always need to extend linearly. They may be partially bent or may extend in a direction intersecting the first direction X and the second direction Y. The pixel electrodes PE and the switching elements SW are disposed in the subpixel SP, respectively. Each of the switching elements SW is electrically connected to an associated scanning line G and an associated signal line S. Each of the pixel electrodes PE is electrically connected to an associated switching element SW.

In the example illustrated in FIG. 5, each pixel MP includes three subpixels SP. To such a pixel MP including three subpixels SP, three signal lines S and two scanning lines G are allocated. However, a scanning line G located between pixels MP adjacent to each other in the second direction Y is shared between these adjacent pixels MP.

The first drive circuit DR1 and the second drive circuit DR2 are located in the non-display area NDA. The first driving circuit DR1 is electrically connected to portions of the scanning lines G which are located in the non-display area NDA. The second drive circuit DR2 is electrically connected to portions of the signal lines S which are located in the non-display area NDA. The first driving circuit DR1 outputs a control signal to each of the scanning lines G. The second drive circuit DR2 supplies an image signal (for example, a video signal) to each of the signal lines S.

FIG. 6 is a configuration view illustrating two pixels MP (MP1 and MP2) included in the liquid crystal display panel PNL. Also, FIG. 6 illustrates an electrical connection between scanning lines G, signal lines S, switching elements SW and pixel electrodes PE.

In the example illustrated in FIG. 6, the pixels MP are made adequate for a fringe field switching (FFS) mode which is a display mode, but an illustration of the common electrode is omitted. The scanning lines G and the signal lines S are formed in the array substrate, whereas a light-shielding layer SH is formed in the counter-substrate. The light-shielding layer SH is indicated by a chain double-dashed line in FIG. 6.

As illustrated in FIG. 6, a first subpixel SP1 includes: a switching element SW1 electrically connected to a signal line S1 and a scanning line G1; and a pixel electrode PE1 electrically connected to the switching element SW1.

A second subpixel SP2 includes: a switching element SW2 electrically connected to a signal line S2 and a scanning line G2; and a pixel electrode PE2 electrically connected to the switching element SW2.

A third subpixel SP3 includes: a switching element SW3 electrically connected to a signal line S3 and the scanning line G1; and a pixel electrode PE3 electrically connected to the switching element SW3.

A seventh subpixel SP7 includes: a switching element SW7 electrically connected to the signal line S1 and the scanning line G2; and a pixel electrode PE7 electrically connected to the switching element SW7.

An eighth subpixel SP8 includes: a switching element SW8 electrically connected to the signal line S2 and the scanning line G3; and a pixel electrode PE8 electrically connected to the switching element SW8.

A ninth subpixel SP9 includes: a switching element SW9 electrically connected to the signal line S3 and the scanning line G2; and a pixel electrode PE9 electrically connected to the switching element SW9.

Between the subpixels SP, the scanning lines G and the signals S, the following relationship is established: the first subpixel SP1, the second subpixel SP2, the seventh subpixel SP7 and the eighth subpixel SP5 are formed between the signal lines S1 and S2. The first subpixel SP1 and the second subpixel SP2 are adjacent to each other in the second direction Y, with no scanning line G interposed between them. The second subpixel SP2 and the seventh subpixel SP7 are adjacent to each other in the second direction Y, with the scanning line G2 interposed between them. The seventh subpixel SP7 and the eighth subpixel SP8 are adjacent to each other in the second direction Y, with no scanning line G interposed between them. The third subpixel SP3 and the ninth subpixel SP9 are located between the signal lines S2 and S3. The third subpixel SP3 and the ninth subpixel SP9 are adjacent to each other in the second direction Y, with the scanning line G2 interposed between them. The scanning lines G1 to G3 are formed without crossing any of the subpixels SP. The third subpixel SP3 is adjacent to the first subpixel SP1 and the second subpixel SP2 in the first direction X, with the signal line S2 interposed between the third subpixel SP3 and the first and second subpixels SP1 and SP2. The ninth subpixel SP9 is adjacent to the seventh subpixel SP7 and the eighth subpixel SP8 in the first direction X, with the signal line S2 interposed between the ninth subpixel SP9 and the seventh and eighth subpixels SP7 and SP8.

Between the pixel electrodes PE, the scanning lines G and the signals S, the following relationship is established: the pixel electrode PE1, the pixel electrode PE2, the pixel electrode PE7 and the pixel electrode PE8 are located between the signal lines S1 and S2. The pixel electrodes PE1 and PE2 are adjacent to each other in the second direction Y, with no scanning line interposed between them. The pixel electrodes PE2 and PE7 are adjacent to each other in the second direction Y, with the scanning line G2 interposed between them. The pixel electrodes PE7 and PE8 are adjacent to each other in the second direction Y, with no scanning line interposed between them. The pixel electrode PE3 and the pixel electrode PE9 are located between the signal lines S2 and S3. The pixel electrodes PE3 and PE9 are adjacent to each other in the second direction Y, with the scanning line G2 interposed between them. The scanning lines G1 to G3 are formed without crossing any of the pixel electrodes PE. The pixel electrode PE3 is adjacent to the pixel electrodes PE1 and PE2 in the first direction X, with the signal line S2 interposed between the pixel electrode PE3 and the pixel electrodes PE1 and PE2. The pixel electrode PE9 is adjacent to the pixel electrodes PE7 and PE8 in the first direction X, with the signal line S2 interposed between the pixel electrode PE9 and the pixel electrodes PE7 and PE8.

The light-shielding layer SH is shaped along the boundaries between subpixels SP, and made up of a plurality of extension portions each formed in the shape of a band. The light-shielding layer SH is located opposite to a plurality of scanning lines G such as scanning lines G1 to G3 and a plurality of signal lines S such as signal lines S1 to S4. Also, the light-shielding layer SH is located opposite to switching elements which are simplified in FIG. 6. Also, with respect to areas which do not face the scanning lines G or the signal lines S, in an area between the first subpixel SP1 and the second subpixel SP2 and an area between the seventh subpixel SP7 and the eighth subpixel SP8, portions (extension portions) of the light-shielding layer SH are provided.

Areas surrounded by the light-shielding layer SH serve as areas for use in displaying an image. The light-shielding layer SH has portions each facing two signal lines S and portions each facing a single signal line S, and in the first direction X, the width of each portion facing two signal lines S is greater than that of each portion facing a single signal line S. Also, the light-shielding layer SH has portions facing the scanning lines G, and in the second direction Y, the width of each of these portions is greater than the distance between the first subpixel SP1 and the second subpixel SP2, and also greater than the distance between the seventh subpixel SP7 and the eighth subpixel SP8.

It should be noted that in an X-Y plane in which the first pixel MP1 is located on the upper side and the third pixel MP3 is located on the lower side, unlike the first embodiment, a pixel electrode PE of each of large subpixels SP may be electrically connected to a scanning line G on the lower side. For example, it may be set that the pixel electrode PE3 is electrically connected to the scanning line G2 via the switching element SW3, and the pixel electrode PE9 is electrically connected to the scanning line G3 via the switching element SW9.

Furthermore, unlike the first embodiment, it may be set that a single signal line S is located between pixels MP adjacent to each other in the first direction X, and two signal lines S are located between subpixels SP of a single pixel MP which are adjacent to each other in the first direction X.

Figure 7:
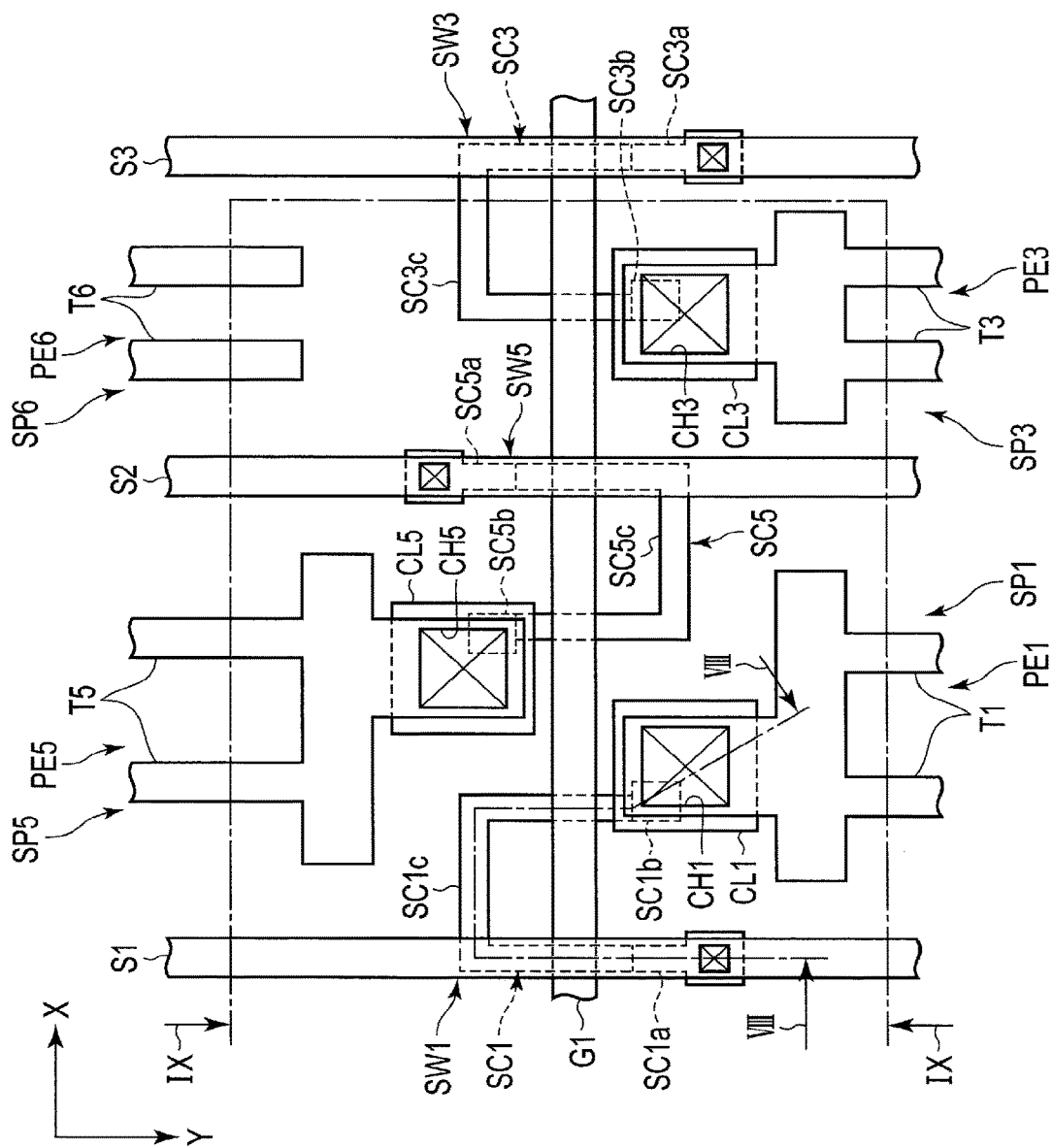
FIG. 7 is an enlarged plan view illustrating part of the two pixels as illustrated in FIG. 6.

FIG. 7 is an enlarged plan view illustrating a part of two pixels as illustrated in FIG. 6. To be more specific, FIG. 7 illustrates the first subpixel SP1 and the third subpixel SP3 of the first pixel MP1, and the fifth subpixel SP5 and the sixth subpixel SP6 of the fifth pixel MP5.

As illustrated in FIG. 7, each of the subpixels SP includes a conductive layer CL. The first subpixel SP1 includes a conductive layer CL1 located between the signal lines S1 and S2. The third subpixel SP3 includes a conductive layer CL3 located between the signal lines S2 and S3. The fifth subpixel SP5 includes a conductive layer CL5 located between the signal lines S1 and S2. The conductive layer CL5 is located opposite to the conductive layer CL1 with respect to the scanning line G1.

The pixel electrode PE1 is in contact with the conductive layer CL1 through a contact hole CH1, and electrically connected to the switching element SW1. The pixel electrode PE3 is in contact with the conductive layer CL3 through a contact hole CH3, and electrically connected to the switching element SW3. The pixel electrode PE5 is in contact with the conductive layer CL5 through a contact hole CH5, and electrically connected to the switching element SW5. Each of the switching elements SW includes a semiconductor layer SC.

The switching element SW1 includes a semiconductor layer SC1. The semiconductor layer SC1 includes a first region SC1$a$ electrically connected to the signal line S1, a second region SC1$b$ electrically connected to the pixel electrode PE1 via the conductive layer CL1, and a third region SC1$c$ located between the first region SC1$a$ and the second region SC1$b$.

The switching element SW3 includes a semiconductor layer SC3. The semiconductor layer SC3 includes a first region SC3$a$ electrically connected to the signal line S3, a second region SC3$b$ electrically connected to the pixel electrode PE3 via the conductive layer CL3, and a third region SC3$c$ located between the first region SC3$a$ and the second region SC3$b$.

The switching element SW5 includes a semiconductor layer SC5. The semiconductor layer SC5 includes a first region SC5$a$ electrically connected to the signal line S2, a second region SC5$b$ electrically connected to the pixel electrode PE5 via the conductive layer CL5, and a third region SC5$c$ located between the first region SC5$a$ and the second region SC5$b$.

In the first embodiment, each of the third regions SC1$c$, SC3$c$ and SC5$c$ cross the scanning line G1 in two positions. Thus, as the switching elements SW, double-gate thin-film transistors are used.

The pixel electrode PE1 includes comb-tooth electrodes T1. The pixel electrode PE3 includes comb-tooth electrodes T3. The pixel electrode PE5 includes comb-tooth electrodes T5. The pixel electrode PE6 includes comb-tooth electrodes T6. The comb-tooth electrodes T1 and T3 extend parallel to each other. In the example illustrated in FIG. 7, they extend in the second direction Y. The comb-tooth electrodes T5 and T6 extend parallel to each other. In the example illustrated in FIG. 7, they extend in the second direction Y. Of the comb-tooth electrodes T1, T3, T5 and T6, the comb-tooth electrodes T1, T3 and T5 extend in a direction away from the scanning line G1.

Figure 8:
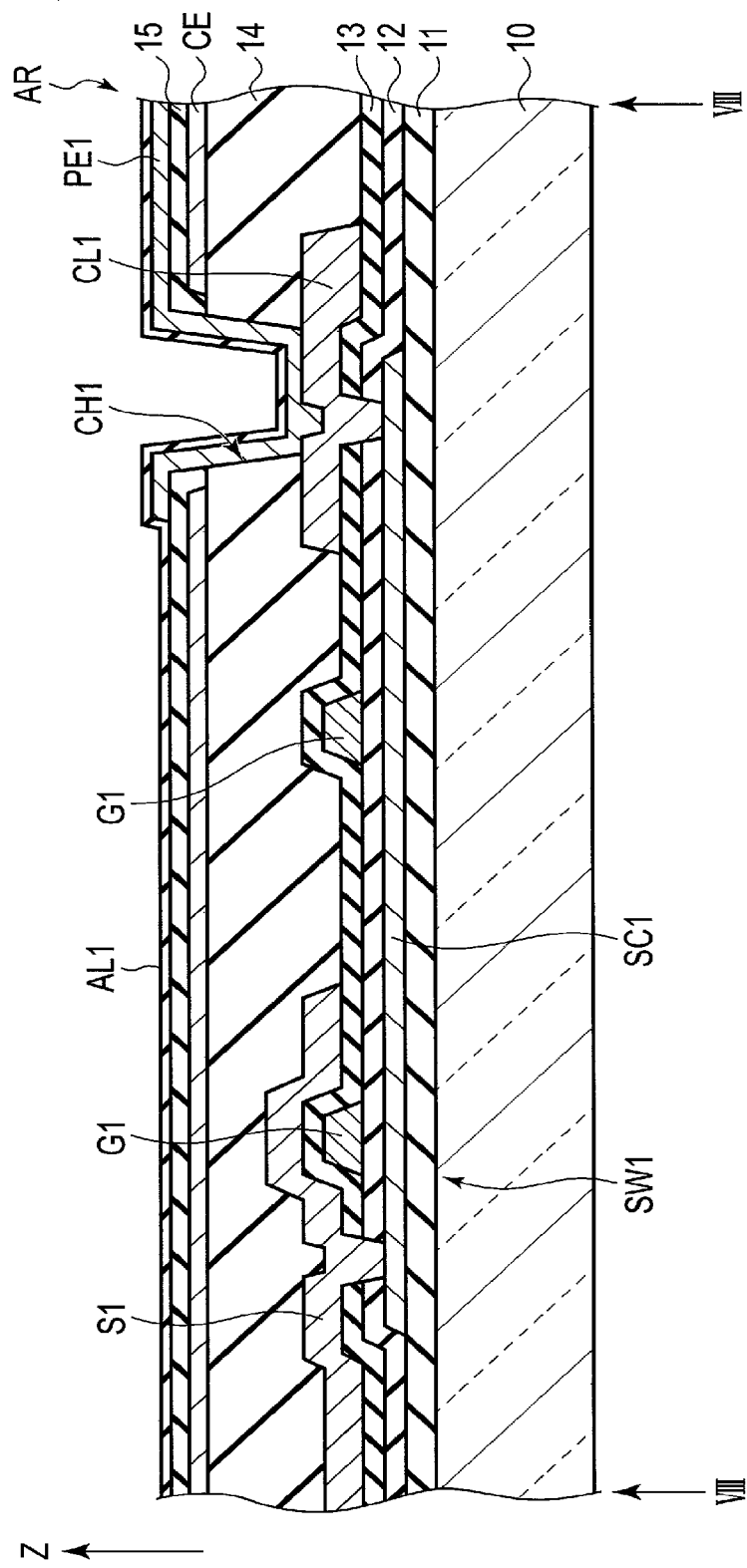
FIG. 8 is a cross-sectional view of an array substrate which is taken along line VIII-VIII in FIG. 7.

FIG. 8 is a cross-sectional view of the array substrate AR which is taken along line VIII-VIII in FIG. 7.

As illustrated in FIG. 8, the array substrate AR is formed of a first insulating substrate 10 having light transmissivity, such as a glass substrate or a plastic substrate. The array substrate AR includes a first insulating film 11, a second insulating film 12, a third insulating film 13, a fourth insulating film 14, a fifth insulating film 15, the switching element SW1, the pixel electrode 251, a common electrode CE, a first alignment film AL1, etc. In the example illustrated in FIG. 8, the switching element SW1 has a top-gate structure. However, it may have a bottom-gate structure.

The first insulating film 11 is formed on the first insulating substrate 10. The semiconductor layer SC1 of the switching element SW1 is formed on the first insulating film 11. The semiconductor layer SC1 is formed of, for example, polycrystalline silicon, but may be formed of amorphous silicon, an oxide semiconductor or the like.

The second insulating film 12 is formed on the first insulating film 11 and the semiconductor layer SC1. The scanning line G1 is formed on the second insulating film 12 and opposite to the semiconductor layer SC1 in two positions. A third insulating film 13 is formed on the scanning line G1 and the second insulating film 12. The signal line S1 and the conductive layer CL1 are formed on the third insulating film 13. The signal line S1 is in contact with the semiconductor layer SC1 through a contact hole which penetrates the second insulating film 12 and the third insulating film 13. The conductive layer CL1 is in contact with the semiconductor layer SC1 through another contact hole which penetrates the second insulating film 12 and the third insulating film 13.

A fourth insulating film 14 is formed on the third insulating film 13, the signal line S1 and the conductive layer CL1. The common electrode CE is formed on the fourth insulating film 14. The fifth insulating film 15 is formed on the fourth insulating film 14 and the common electrode CE. The first insulating film 11, the second insulating film 12, the third insulating film 13 and the fifth insulating film 15 are formed of an inorganic material such as a silicon nitride (SiN) or a silicon oxide (SiO). The fourth insulating film 14 is formed of an organic material such as an acrylic resin.

The pixel electrode PE1 is formed on the fifth insulating film 15. The pixel electrode PE1 is in contact with the conductive layer CL1 through the contact hole CH1 which penetrates the fourth insulating film 14 and the fifth insulating film 15. The common electrode CE and the pixel electrode PE1 form a conductive material. For example, the common electrode CE and the pixel electrode PE1 are formed of a transparent, electrically conductive material such as indium zinc oxide (IZO) or indium tin oxide (ITO). The first alignment film AL1 is formed on the fifth insulating film 15 and the pixel electrode PE1. The first alignment film AL1 is formed of, for example, a material having a horizontal alignment property.

Figure 9:
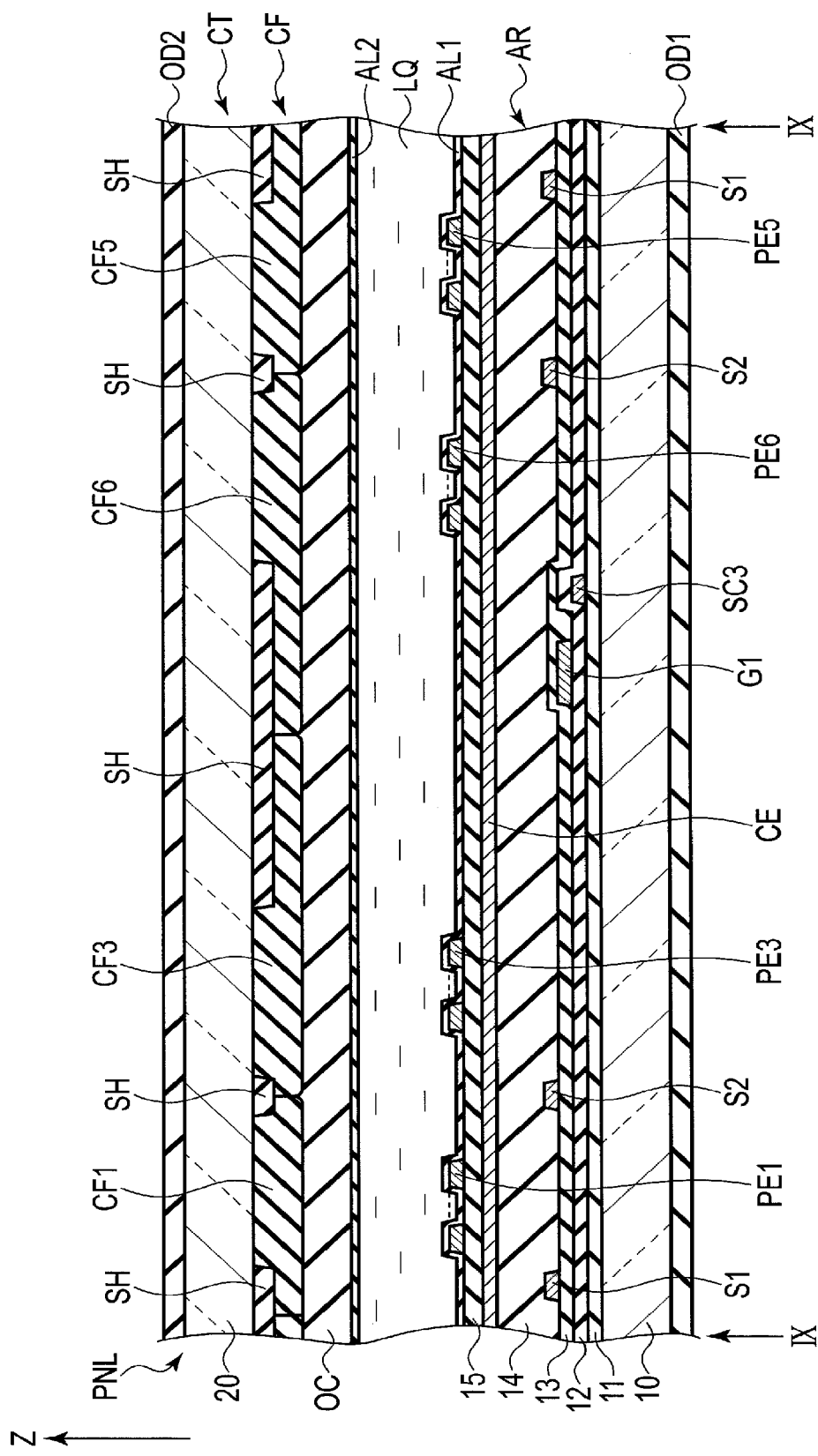
FIG. 9 is a cross-sectional view of the liquid crystal display panel which is taken along line IX-IX in FIG. 7.

FIG. 9 is a cross-sectional view of the liquid crystal display panel PNL which is taken along line IX-IX in FIG. 7.

As illustrated in FIG. 9, in the array substrate AR, the semiconductor layer SC3 is formed on the first insulating film 11 and covered with the second insulating film 12. The scanning line G1 is formed on the second insulating film 12 and covered with the third insulating film 13. The signal lines S1 and S2 are formed on the third insulating film 13 and covered with the fourth insulation film 14. The common electrode CE is formed on the fourth insulating film 14 and is covered with the fifth insulating film 15. In the example illustrated in FIG. 9, the common electrode CE also extends to a position located opposite to the scanning line G1 and the signal lines S1 and S2. The pixel electrodes PE1, PE3, PE5 and PE6 are formed on the fifth insulating film 15 and covered with the first alignment film AL1.

The counter-substrate CT is formed of a second insulating substrate 20 having a light transmittivity, such as a glass substrate or a resin substrate. The counter-substrate CT includes the light-shielding layer SH, a color filter CF, an overcoat layer OC, a second alignment film AL2, etc. The color filter CF includes a plurality of colored layers having different colors and different sizes.

The light-shielding layer SH is formed on a side of the second insulating substrate 20, which is located opposite to the array substrate AR. The light-shielding layer SH have portions which are formed opposite to the scanning lines G1 and the signal lines S1 and S2.

To be more specific, a colored layer CF1 is located opposite to the pixel electrode PE1. A colored layer CF3 is located opposite to the pixel electrode PE3. A colored layer CF5 is located opposite to the pixel electrode PE5. A colored layer CF6 is located opposite to the pixel electrode PE6. The colored layers CF1, CF3, CF5 and CF6 overlap with the light-shielding layer SH at their end portions. For example, the colored layer CF1 is a blue-colored layer, the colored layer CF3 is a red-colored layer, the colored layer CF5 is a transparent colored layer, and the colored layer CF6 is a blue-colored layer.

The overcoat layer OC is formed of a transparent resin material, and covers the colored layers CF1, CF3, CF5 and CF6. The second alignment film AL2 is formed on a side of the overcoat layer OC, which is located opposite to the array substrate AR. The alignment film AL2 is formed of, for example, a material exhibiting a horizontal alignment property.

In the example illustrated in FIG. 9, the color filter CF is formed in the counter-substrate CT, but may be formed in the array substrate AR. In addition, the color filter CF can be formed without including the transparent colored layer.

The liquid crystal display device DSP according to the first embodiment is formed as described above.

Next, drive units of the liquid crystal display device DSP according to the first embodiment will be described.

The first drive circuit DR1 and the second drive circuit DR2 function as drive units which drive the signal lines S and the scanning lines G. In the first embodiment, the second drive circuit DR2 is provided in a drive IC chip IC. However, the drive units which drive the signal lines S and the scanning lines G are not limited to the first and second drive circuits DR1 and DR2. That is, the drive units can be variously modified. For example, the drive units may be formed as drive IC chips IC or control modules CM. Furthermore, the drive units may be formed as circuits or modules other than the first drive circuit DR1, the drive IC chip IC (the second drive circuit DR2) and the control module CM.

The drive units supply image signals to the first to ninth subpixels SP1 to SP9 of the first to ninth pixels MP1 to MP9, through a plurality of signal lines S.

Next, a driving method of the liquid crystal display device DSP according to the first embodiment will be explained. The following explanation is given with respect to a method for supplementing part of a displayed image, which corresponds to the first pixel MP1 (i.e., a color display made by the first pixel MP1, in which in the case where the color display made by the first pixel MP1 is short in green, a pixel MP adjacent to the first pixel MP1 is caused to display the green in which the above color display is short. It should be noted that the driving method to be explained is also applicable as a driving method for the case where a color display made by a pixel MP other than the first pixel MP1 is short in some color.

FIG. 10 is a view for explaining the driving method of the liquid crystal display device DSP of the first embodiment, and also a plan view illustrating a single pixel group MPG.

As illustrated in FIG. 10, the first pixel MP1 includes a first subpixel SP1 which is blue, a second subpixel SP2 which is white, and a third subpixel SP3 which is red, but does not include a green subpixel SP. Therefore, there is a case where a desired color display cannot be produced by the first pixel MP1 solely. Thus, in the case of producing a color display containing green which the first pixel MP1 does not have, the drive units adjust a voltage of an image signal or signals to be supplied to one or two to-be-assigned subpixels SP, i.e., one or two subpixels which display green, and are included in any of the second pixel MP2, the third pixel MP3, the fourth pixel MP4 and the fifth pixel MP5, which are adjacent to the first pixel MP1. In the first embodiment, in the above case, one or two subpixels are selected as the to-be-assigned subpixels from among the fourth subpixel SP4 of the second pixel MP2, the ninth subpixel SP9 of the third pixel MP3, the ninth subpixel SP9 of the fourth pixel MP4 and the fourth subpixel SP4 of the fifth pixel MP5. The image signal of the voltage of which has been adjusted is supplied to a pixel electrode or electrodes PE through a signal line S. It is therefore possible to assign a display of green which the first pixel MP1 does not have to the to-be-assigned subpixel or subpixels, to thereby supplement the image display produced by the first pixel MP1.

For example, in the case of applying the first pixel MP1, the second pixel MP2 and the third pixel MP3, at least one of the fourth subpixel 524 of the second pixel MP2 and the ninth subpixel SP9 of the third pixel MP3 is used as the to-be-assigned subpixel. Furthermore, it is possible to adjust the luminance level of green in accordance with which subpixel or subpixels are selected as the to-be-assigned subpixel or subpixels. For example, in the case where two large subpixels, i.e., two ninth subpixels SP9, are selected as the to-be-assigned subpixels, the luminance level of green can be increased substantially double that in the case where a single large subpixel, i.e., a single ninth subpixel SP9, is selected as the to-be-assigned subpixel. In the case where a single small subpixel, i.e., a single fourth subpixel SP4, is selected as the to-be-assigned subpixel, the luminance level of green can be decreased substantially half that in the case where a single large subpixel, i.e., a single ninth subpixel SP9, is selected as the to-be-assigned subpixel.

In the liquid crystal display device DSP according to the first embodiment and the driving method of the liquid crystal display device DSP as described above, the liquid crystal display device DSP comprises a plurality of signal lines S arranged in the first direction X, a plurality of scanning lines G arranged in the second direction Y, first pixels MP1, second pixels MP2 and third pixels MP3. Each of the first pixels MP1 includes a first subpixel SP1 which displays blue (first color), a second subpixel SP2 which displays white and a third subpixel SP3 which displays red (second color). The second pixel MP2 is adjacent to a side of the first pixel MP1, and includes a fourth subpixel SP4 which displays green (third color), a fifth subpixel SP5 which displays white, and a sixth subpixel SP6 which displays blue (first color). The third pixel MP3 is adjacent to another side of the first pixel MP1, and includes a seventh subpixel SP7 which displays red (second color), an eighth subpixel SP8 which displays white, and a ninth subpixel SP9 which displays green (third color).

The number of subpixels included in a pixel MP can be set smaller than that in the case where a pixel MP is made up of a red subpixel, a green subpixel, a blue subpixel and a white subpixel, i.e., four subpixels SP. Since the ratio of a signal line S or the light-shielding layer SH to the area of a subpixel SP is set lower, it is possible to improve the aperture ratio (the ratio of an area which contributes to an image display) without reducing the effective resolution.

All the pixels MP each include a small and white (W) subpixel SP. It is therefore possible to improve the luminance level of a displayed image without reducing the effective resolution. Furthermore, it is possible to obtain a liquid crystal display device DSP having a high brightness and a high resolution.

In the case where a color display made by the first pixel MP1 is short in green, the drive units adjust a voltage of an image signal to be supplied to a to-be-assigned subpixel or subpixels, which display green, and are included in any of the pixel MP2, the pixel MP3, the pixel MP4 and the pixel MP5, which are adjacent to the first pixel MP1. Since a display of green in which the color display made by the first pixel MP1 is short can be assigned to the to-be-assigned subpixel or subpixels, the color display produced by the first pixel MP1 can be supplemented.

The to-be-assigned subpixel or subpixels are selected from the pixels MP adjacent to the first pixel MP1. It is therefore possible to display desired color with a higher precision and improve the sharpness of the outline of a displayed image, as compared with the case where the to-be-assigned subpixel or subpixels are selected from pixels MP not adjacent to the first pixel MP1. For example, the sharpness of the outline of the displayed image can be improved, as compared with the case where pixels MP to be applied are two kinds of pixels MP, i.e., first pixels each including a red subpixel and a green subpixel and second pixels each including a blue subpixel and a white subpixel.

By using only one subpixel SP as a to-be-assigned subpixel, it is possible to restrict enlargement of a display area for displaying an image part corresponding to a single first pixel MP1 (a color display produced by the first pixel MP1), and thus display an image having a high sharpness.

By contrast, by using two subpixels SP as to-be-assigned subpixels, the display area for displaying the image part corresponding to the single first pixel MP1 is increased, as a result of which green displayed on a pixel group MPG can be made more uniform, and thus an image in which a jaggy does not easily occur can be displayed.

In the case where two subpixels SP are used as to-be-assigned subpixels, the luminance of each of the to-be-assigned subpixels is variable. It suffices that with respect to a color display produced by the first pixel MP1, which is short in green, a display of short green is entirely assigned to the two subpixels SP used as the to-be-assigned subpixels. In this assignment, two subpixels SP are randomly selected as to-be-assigned subpixels. For example, in every frame period, the luminance of the to-be-assigned subpixels can be varied. Alternatively, in every frame period, the subpixel or subpixels used as the to-be-assigned subpixel or subpixels may be changed. Thereby, it is possible to reduce coloring occurring in the outline of a displayed image, and also reduce a moire appearing in the outline of the image.

Furthermore, as described above, each of the pixels MP includes a white subpixel SP. Thus, when an image is displayed, the white subpixel SP can be preferentially driven, and white can be preferentially lit (displayed). It is possible to decrease the number of to-be-assigned subpixels, and thus display an image having a high sharpness.

However, in order to prevent a grainy pattern of a displayed image from being visibly recognized, driving of the white subpixel SP may be adjusted to adjust the luminance level of white.

For the above reason, in the first embodiment, it is possible to obtain a liquid crystal display device DSP having a high display quality and a driving method of the liquid crystal display device DSP. Also, it is possible to obtain a liquid crystal display device DSP where the fall of sharpness is small and having a high brightness and a high resolution and a driving method of the liquid crystal display device DSP.

Second Embodiment

Next, a liquid crystal display device DSP according to the second embodiment and a driving method thereof will be described. The liquid crystal display device DSP according to the second embodiment is formed to have the same structure as or a similar structure to that of the liquid crystal display device DSP according to the first embodiment.

A driving method of the liquid crystal display device DSP according to the second embodiment will be explained. The following explanation is given with respect to a method for supplementing part of a displayed image, which corresponds to the first pixel MP1, in which in the case where the part corresponding to the first pixel MP1 is short in green, a small subpixel SP of a pixel MP adjacent to the first pixel MP1 is preferentially caused to display green in which the part is short. It should be noted that the driving method to be explained is also applicable as a driving method for the case where in a displayed image, a pixel MP other than the first pixel MP1 is short in some color.

FIG. 11 is a view for explaining the driving method of the liquid crystal display device DSP according to the second embodiment, and also a plan view illustrating a single pixel group MPG.

As illustrated in FIG. 11, the first pixel MP1 does not include a green subpixel SP. Therefore, there is a case where a desired color display cannot be produced by the first pixel MP1 solely. Thus, in the case where part of a displayed image which corresponds to the first pixel MP1 is short in green, the drive units determine whether the above part of the displayed image can be supplemented with the fourth subpixel SP4 of the second pixel MP2 adjacent to the first pixel MP1 or the fourth subpixel SP4 of the fifth pixel MP5. That is, the drive units determine whether the above part can be supplemented with a small green subpixel of a pixel MP adjacent to the first pixel MP1 or not.

When the drive units determine that the part can be supplemented with the fourth subpixel SP4 of the second pixel MP2 or the fifth pixel MP5, they adjust a voltage of an image signal to be supplied to the fourth subpixel SP4. As a result, a display of short green at the first pixel MP1 can be preferentially assigned to the above fourth subpixel SP4, and the part of the displayed image which corresponds to the first pixel MP1 can thus be supplemented.

As described above, since only one small subpixel SP is used as a to-be-assigned subpixel, it is possible to restrict enlargement of the display area for displaying the image part corresponding to the first pixel MP1. Furthermore, it is possible to decrease the expansion of the luminance distribution, and thus display an image having a high sharpness.

It should be noted that in the case where (1) a color display which is produced by the first pixel MP1 and is short in green can be supplemented with either the fourth subpixel SP4 of the second pixel MP2 or the fourth subpixel SP4 of the fifth pixel MP5, and (2) the first pixel MP1 is located in an outline portion of a displayed image, the drive units may determine a to-be-assigned subpixel determining which of the fourth subpixels SP4 should be applied as a supplement to the above display in order that jaggy would not easily occur in the image. It should be noted that "the drive units may determine . . . in order that jaggy would not easily occur in the image" can be restated as "the drive units may determine . . . in order that luminance distribution of the image would not easily be discontinuous".

On the other hand, when the drive units determines that the above part cannot be supplemented with the fourth subpixel SP4 of the second pixel MP2 or the fifth pixel MP5, they adjust the voltage of an image signal to be supplied to the ninth subpixel S29 of the third pixel MP3 or the ninth subpixel SP9 of the fourth pixel MP4. Thereby, a display of the short green at the first pixel MP1 can be assigned to the ninth subpixel SP9 of the third pixel MP3 or the fourth pixel MP4, and the color display produced by the first pixel MP1 can be supplemented.

As described above, in the case where a display of green in which the image part corresponding to the first pixel MP1 (the color display produced by the first pixel MP1) is short cannot be assigned to a single small subpixel SP, it is effective that only a single large subpixel SP is applied as a to-be-assigned subpixel. It should be noted that in the case where only a single large subpixel SP is used as a to-be-assigned subpixel, it is possible to more restrict enlargement of the display region for displaying the image part corresponding to the first pixel MP1, as compared with the case where two small subpixels SP are used as to-be-assigned subpixels. Since it is possible to decrease the expansion of the luminance distribution, an image having a high sharpness can be displayed.

It should be noted that in the case where (1) the color display which is produced by the first pixel MP1 and is short in green can be supplemented with either the ninth subpixel SPY of the third pixel MP3 or the ninth subpixel SPY of the fourth pixel MP4, and (2) the first pixel MP1 is located in an outline portion of a displayed image, the drive units may determine a to-be-assigned subpixel determining which of the ninth subpixels SPY should be applied as a supplement to the above display in order that jaggy would not easily occur in the image.

In the liquid crystal display device DSP according to the second embodiment and the driving method thereof as explained above, the liquid crystal display device DSP is formed in the same manner as the liquid crystal display device DSP according to the first embodiment. Therefore, in the second embodiment, the same advantages as in the first embodiment can be obtained.

Furthermore, in the second embodiment, in the case where part of a displayed image which corresponds to the first pixel MP1 is short in green, the drive units can preferentially adjust a voltage of the image signal to be supplied to a fourth subpixel SP4 which is formed to have a small size and display green, and is included in any of pixels MP adjacent to the first pixel MP1. Since a display of green in which the first pixel MP1 is short can be preferentially assigned to a small subpixel SP, this can contribute to displaying of an image having a high sharpness.

Also, in the second embodiment, each of the pixels MP includes a white subpixel SP. Thus, when an image is displayed, the white subpixel SP can be preferentially driven, and white can be preferentially lit (displayed). However, in the second embodiment also, in order to prevent a grainy pattern of a displayed image from being visibly recognized, driving of the white subpixel SP may be adjusted to adjust the luminance level of white.

By virtue of the above structure, in the second embodiment, it is possible to obtain a liquid crystal display device DSP having a high display quality and a method of driving the liquid crystal display device DSP. Also, it is possible to obtain a liquid crystal display device DSP which has a high brightness and a high resolution and in which the degree of lowering of the sharpness is small and a method of driving the liquid crystal display device DSP.

Third Embodiment

Next, a liquid crystal display device DSP according to the third embodiment and a driving method thereof will be described. The liquid crystal display device DSP according to the third embodiment is formed to have the same structure as or a similar structure to that of the liquid crystal display device DSP according to the first embodiment.

A driving method of the liquid crystal display device DSP according to the third embodiment will be explained. The following explanation is given with respect to what driving method is applied in the case where a target area AG displays green, a first pixel MP1 of a first pixel group MPG is located in an outer edge portion of the target area AG, and the first pixel MP1 is short in green. It should be noted that the driving method, which will be described below, can also be applied to the case where a pixel MP other than the first pixel MP1 in the first pixel group MPG is short in color which it does not have.

Figure 12:
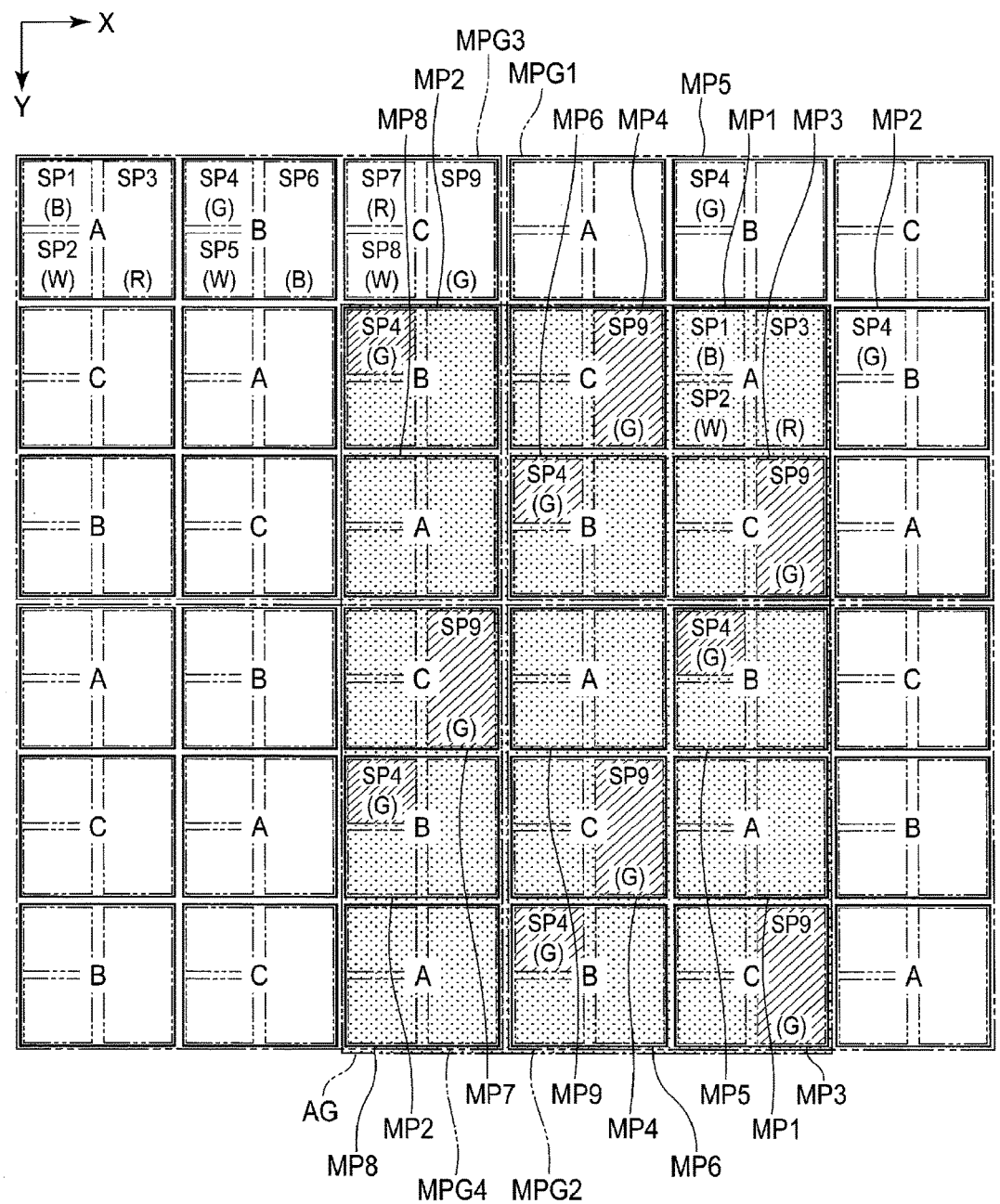
FIG. 12 is a view for explaining a driving method of a liquid crystal display device according to a third embodiment, and also a plan view illustrating four adjacent pixel groups.

FIG. 12 is a view for explaining the driving method of the liquid crystal display device DSP according to the third embodiment, and also a plan view illustrating four adjacent pixel groups MPG. FIG. 12 illustrates a first pixel group MPG1, a second pixel group MPG2, a third pixel group MPG3 and a fourth pixel group MPG4. The target area AG is an area dotted and colored gray. Referring to FIG. 12, only green subpixels SP in the target area AG are lit.

As illustrated in FIG. 12, in order that green (third color) be displayed in the target area AG, by driving by the driving units, green is displayed by a third pixel MP3, a fourth pixel MP4 and a sixth pixel MP6 of a first pixel group MPG1, a third pixel MP3, a fourth pixel MP4, a fifth pixel MP5 and a sixth pixel MP6 of a second pixel group MPG2, a second pixel MP2 of a third pixel group MPG3 and a second pixel MP2 and a seventh pixel MP7 of a fourth pixel group MPG4. The first pixel MP1 includes no green subpixel SP. Thus, in the case where green is displayed in the target area AG, a desired color display cannot be produced by the first pixel MP1 solely. Thus, in the target area AG, the first pixel MP1, third pixel MP3, fourth pixel MP4 and sixth pixel MP6 of the first pixel group MPG1, the first pixel MP1, third pixel MP3, fourth pixel MP4, fifth pixel MP5, sixth pixel MP6 and ninth pixel MP9 of the second pixel group MPG2, the second pixel MP2 and eighth pixel MP8 of the third pixel group MPG3 and the second pixel MP2, seventh pixel MP7 and eighth pixel MP8 of the fourth pixel group MPG4 are provided. The first pixel MP1 of the first pixel group MPG1 is located at a corner portion of the target area AG.

Thus, in the case where green (third color) is displayed in the target area AG, and an image part corresponding to the first pixel MP1 of the first pixel group MPG1 (a color display produced by the first pixel MP1), which is located at the outer edge portion of the target area AG, is short in green, the driving units first determine whether the image part corresponding to the first pixel MP1 can be supplemented with one or two green subpixels SP which are located in the target area AG and also included in any of the second to fifth pixels MP2 to MP5 adjacent to the first pixel MP1 of the first pixel group MPG1. In this example, the drive units determine whether or not the above image part which is short in green can be supplemented with at least one of the ninth subpixel SP9 of the third pixel MP3 and the ninth subpixel SP9 of the fourth pixel MP4 in the first pixel group MPG1.

In the case where the drive units determine that the image part can be supplemented with one of the above ninth subpixels SP or both the ninth subpixels SP, they adjust the voltage of an image signal to be supplied to one of the ninth subpixels SP or both the ninth subpixels SP9, which is selected as a to-be-assigned subpixel or subpixels. Thereby, a display of short color (green) in the image part corresponding to the first pixel MP1 can be assigned to the to-be-assigned subpixel or subpixels, to thereby supplement the image part corresponding to the first pixel MP1.

As described above, green subpixels SP located outside the target area AG, such as the fourth subpixel SP4 of the second pixel MP2 and the fourth subpixel SP4 of the fifth pixel MP5 in the first pixel group MPG1, are not selected as to-be-assigned subpixels. Therefore, in the above case (where green is displayed), the target area AG is prevented from being enlarged when green is displayed. In addition, since luminance distribution of the image would not easily be discontinuous, formation of a jaggy in a displayed image can be restricted.

In the liquid crystal display device DSP according to the third embodiment and the driving method thereof as explained above, the liquid crystal display device DSP is formed in the same manner as the liquid crystal display device DSP according to the first embodiment. Therefore, in the third embodiment also, the same advantages as in the first embodiment can be obtained.

Furthermore, in the third embodiment, in the case where green is displayed in the target area AG, and the first pixel MP1 of the first pixel group MPG1 is located at the outer edge portion (corner portion) of the target area AG, the drive units can adjust the voltage of an image signal to be supplied to subpixels SP9 located in pixels MP which are adjacent to the first pixel MP1 of the first pixel group MPG1, and which are also located in the target area AG. Thus, it is possible to prevent the target area AG from being enlarged when green is displayed. Also, since luminance distribution of the image would not easily be discontinuous, formation of a jaggy in a displayed image can be restricted.

By virtue of the above structure, in the third embodiment, it is possible to obtain a liquid crystal display device DSP having a high display quality and a driving method of the liquid crystal display device DSP. Also, it is possible to obtain a liquid crystal display device DSP which has a high brightness and a high resolution and in which the degree of lowering of the sharpness is small and a method of driving the liquid crystal display device DSP.

Fourth Embodiment

A liquid crystal display device DSP according to the fourth embodiment and a driving method thereof will be described. The liquid crystal display device DSP according to the fourth embodiment is formed to have the same structure as or a similar structure to that of the liquid crystal display device DSP according to the first embodiment.

A driving method of the liquid crystal display device DSP according to the fourth embodiment will be explained. The following explanation is given with respect to what driving method is applied in the case where a target area AG displays green, a first pixel MP1 of a first pixel group MPG is located in an outer edge portion of the target area AG, and the first pixel MP1 is short in green. It should be noted that the driving method, which will be described below, can also be applied to the case where a pixel MP other than the first pixel MP1 in the first pixel group MPG is short in color which it does not have.

Figure 13:
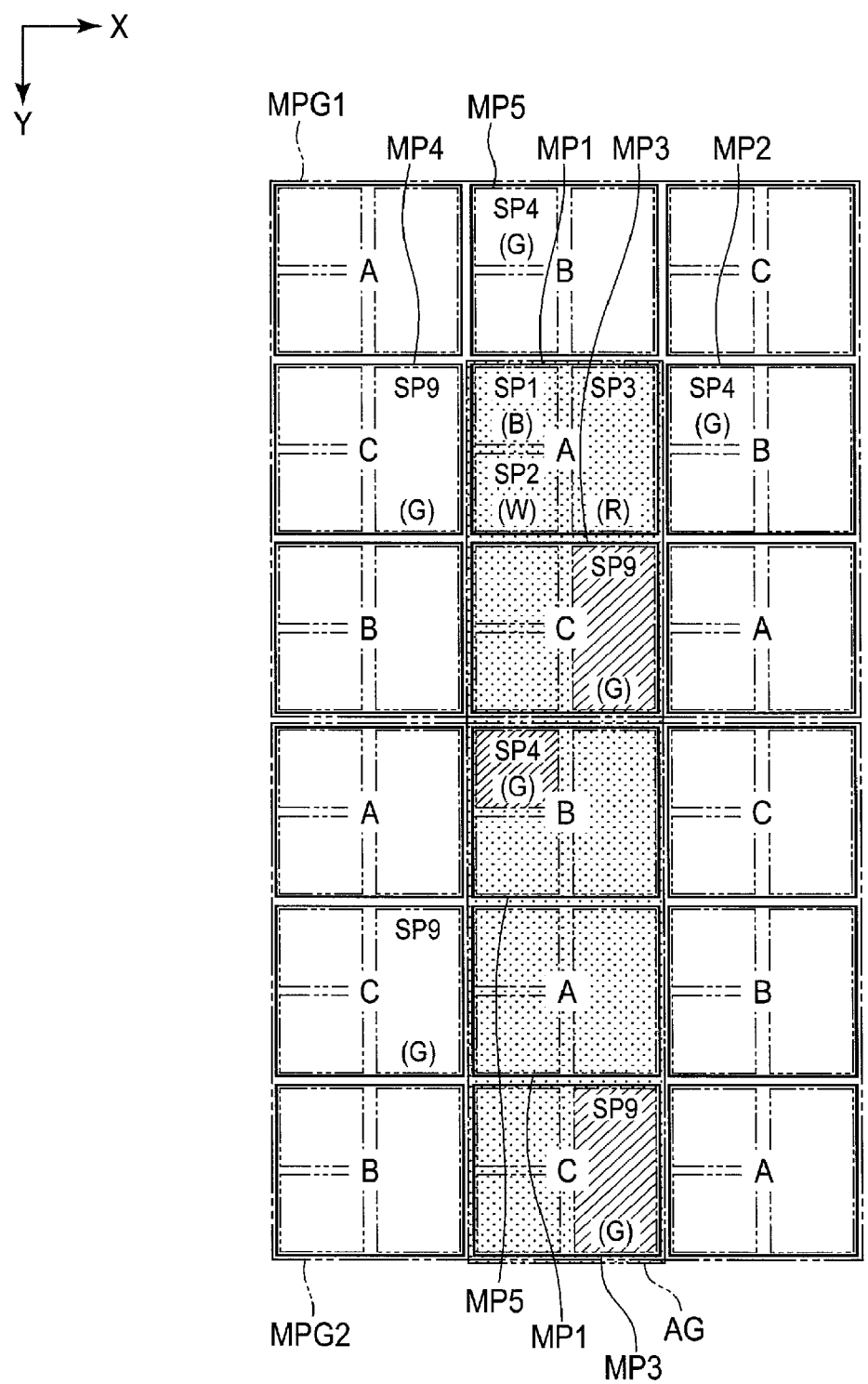
FIG. 13 is a view for explaining a driving method of a liquid crystal display device according to a fourth embodiment, and also a plan view illustrating two adjacent pixel groups.

FIG. 13 is a view for explaining the driving method of the liquid crystal display device DSP according to the fourth embodiment, and also a plan view illustrating two adjacent pixel groups MPG. FIG. 13 shows a first pixel group MPG1 and a second pixel group MPG2.

As illustrated in FIG. 13, in order that green (third color) be displayed in the target area AG, by driving by the driving units, green is displayed by a third pixel MP3 of the first pixel group MPG1 and a third pixel MP3 and a fifth pixel MP5 of a second pixel group MPG2. The first pixels MP1 include no green subpixel SP. Thus, in the case where green is displayed in the target area AG, a desired color display cannot be produced by the first pixels MP1 solely. It should be noted that in the target area AG, the first pixel MP1 and third pixel MP3 of the first pixel group MPG1 and the first pixel MP1, third pixel MP3 and fifth pixel MP5 of the second pixel group MPG2 are located. The first pixel MP1 of the first pixel group MPG1 is located at an end portion of the target area AG.

Thus, in the case where green (third color) is displayed at the target area AG, and an image part corresponding to the first pixel MP1 of the first pixel group MPG1 (a color display produced by the first pixel MP1, which is located at the end portion (outer edge portion) of the target area AG, is short in green, the driving units first determine whether the image part corresponding to the first pixel MP1 can be supplemented with one or two green subpixels SP which are located in the target area AR, and are also included in any of the second to fifth pixels MP2 to MP5 adjacent to the first pixel MP1 of the first pixel group MPG1. In this example, the drive units determine whether the image part corresponding to the first pixel MP1 can be supplemented with the ninth subpixel SP9 of the third pixel MP3 in the first pixel group MPG1.

In the case where the drive units determine that the image part can be supplemented with the ninth subpixel SP9, they adjust the voltage of an image signal to be supplied to the ninth subpixel SP9, which is a to-be-assigned subpixel. It is therefore possible to assign a display of green in which the image part corresponding to the first pixel MP1 is short to the above to-be-assigned subpixel, to thereby supplement the image part.

As described above, green subpixels SP located outside the target area AG, such as the fourth subpixel SP4 of the second pixel MP2, the ninth subpixel SP9 of the fourth pixel MP4 and the fourth subpixel SP4 of the fifth pixel MP5 in the first pixel group MPG1 are not selected as to-be-assigned subpixels. It is therefore possible to prevent the target area AG from being enlarged when green is displayed. Furthermore, since luminance distribution of the image would not easily be discontinuous, formation of a jaggy in a displayed image can be restricted.

On the other hand, when the drive units determines that the image part cannot be supplemented with the ninth subpixel SP9, they do not assign a display of short green to any of all the green subpixels SP in the second to ninth pixels MP2 to MP9 in the first pixel group MPG1 (they do not select any of all the green subpixels SP as a to-be-assigned subpixel.

As described above, in the case where a display of green in which the image part corresponding to the first pixel MP1 is short cannot be assigned to the ninth subpixel SP9, it is effective that no to-be-assigned subpixel is selected. In this case also, it is also possible to prevent the target area AG from being enlarged when green is displayed. Furthermore, since luminance distribution of the image would not easily be discontinuous, formation of a jaggy in a displayed image can be restricted.

In the liquid crystal display device DSP according to the fourth embodiment and the driving method thereof as explained above, the liquid crystal display device DSP is formed in the same manner as the liquid crystal display device DSP according to the first embodiment. Therefore, in the fourth embodiment, the same advantages as in the first embodiment can be obtained.

For example, the driving units can randomly select a to-be-assigned subpixel or subpixels from among the second to ninth pixels MP2 to MP9. In every frame period, the luminance of the to-be-assigned subpixel or subpixels may be changed. Alternatively, in every frame period, subpixels used as the to-be-assigned subpixel or subpixels may be changed.

Furthermore, in the fourth embodiment, in the case where green is displayed in the target area AG, and the first pixel MP1 of the first pixel group MPG1 is located at the outer edge portion (end portion) of the target area AG, the drive units can adjust the voltage of an image signal to be supplied to the subpixel SP9 of a pixel MP which is adjacent to the first pixel MP1 of the first pixel group MPG1, and which is also located in the target area AG. On the other hand, in the case where a display of green in which the image part corresponding to the first pixel MP1 is short cannot be assigned to the ninth subpixel SP9, no to-be assigned subpixel is selected from among the subpixels in pixels MP located outside the target area AG, and the target area AG can thus be prevented from being enlarged when green is displayed. Also, luminance distribution of the image would not easily be discontinuous. Therefore, formation of a jaggy in a displayed image can be restricted.

By virtue of the above structure, in the fourth embodiment, it is possible to obtain a liquid crystal display device DSP having a high display quality and a method of driving the liquid crystal display device DSP. Also, it is possible to obtain a liquid crystal display device DSP which has a high brightness and a high resolution and in which the degree of lowering of the sharpness is small and a method of driving the liquid crystal display device DSP.

Fifth Embodiment

A liquid crystal display device DSP according to the fifth embodiment and a driving method thereof will be described. The liquid crystal display device DSP according to the fifth embodiment is formed to have the same structure as or a similar structure to that of the liquid crystal display device DSP according to the first embodiment.

A driving method of the liquid crystal display device DSP according to the fifth embodiment will be explained. The following explanation is given with respect to a method for supplementing part of a displayed image, which corresponds to the first pixel MP1, in which in the case where the part corresponding to the first pixel MP1 is short in green, a subpixel SP of pixels surrounding the first pixel MP1 is caused to display green. It should be noted that the pixels MP surrounding the first pixel MP1 are eight pixels MP (second to ninth pixels MP2 to MP9). It should be noted that the driving method to be explained is also applicable as a driving method for the case where in a displayed image, a pixel MP other than the first pixel MP1 is short in some color.

Figure 14:
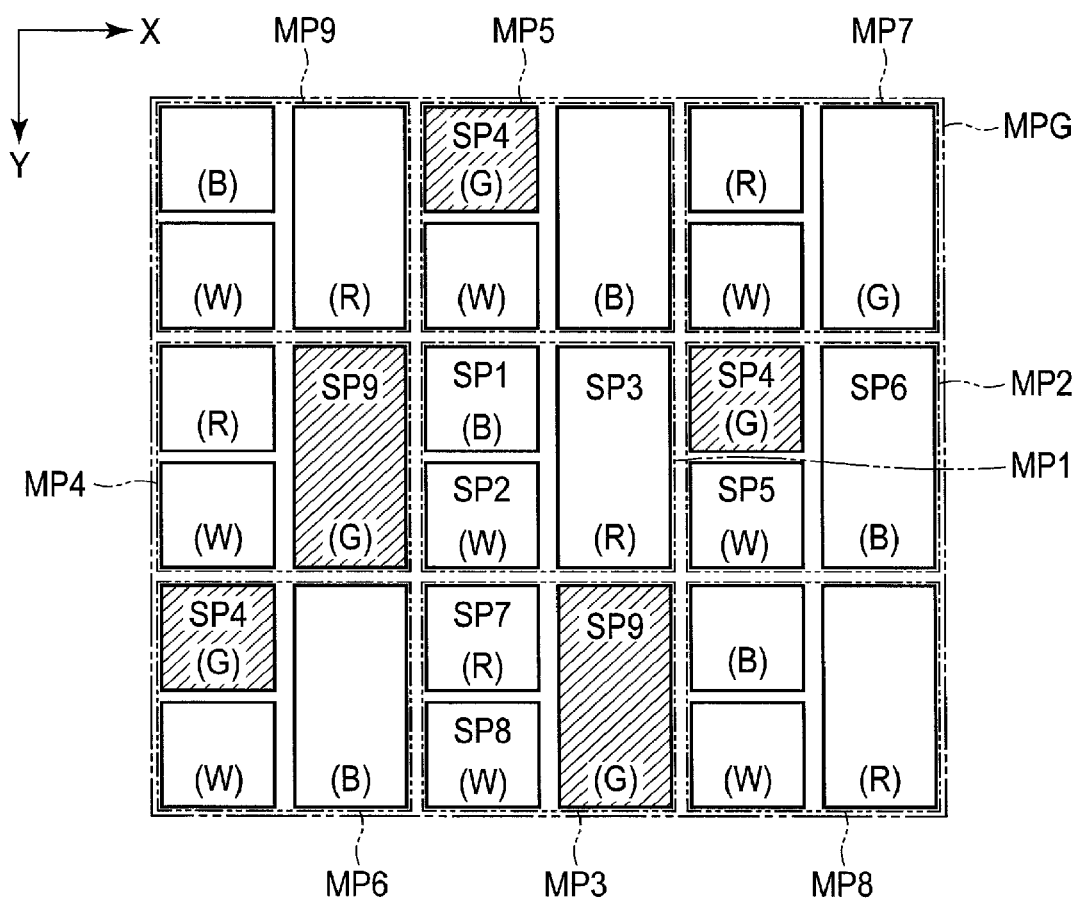
FIG. 14 is a view for explaining a driving method of a liquid crystal display device according to a fifth embodiment, and also a plan view illustrating a single pixel group.

FIG. 14 is a view for explaining the driving method of the liquid crystal display device DSP according to the fifth embodiment, and also a plan view illustrating a single pixel group MPG.

As illustrated in FIG. 14, the first pixel MP1 does not include a green subpixel SP. Therefore, there is a case where a desired color display cannot be produced by the first pixel MP1 solely. Thus, in the case where an image part corresponding to the first pixel MP1 (a color display produced by the first pixel MP1) is short in green, the driving units adjust the voltage of an image signal to be supplied to a to-be-assigned subpixel or subpixels which are one or more of green subpixels SP included in any of the second pixel MP2, the third pixel MP3, the fourth pixel MP4, the fifth pixel MP5, the sixth pixel MP6, the seventh pixel MP7, the eighth pixel MP8 and the ninth pixel MP9, which surround the first pixel MP1. In the fifth embodiment, the to-be-assigned subpixel or subpixels are one or two of the fourth subpixel SP4 of the second pixel MP2, the ninth subpixel SP9 of the third pixel MP3, the ninth subpixel SP9 of the fourth pixel MP4, the fourth subpixel SP4 of the fifth pixel MP5 and the fourth subpixel SP4 of the sixth pixel MP6. The image signal the voltage of which has been adjusted is supplied to a pixel electrode or electrodes PE through a signal line S. Thereby, a display of green in which the image part corresponding to the first pixel MP1 is short can be assigned to the to-be-assigned subpixel or subpixels, to thereby supplement the image part.

For example, by adjusting the to-be-assigned subpixel or subpixels, the luminance level of the above green can be adjusted.

In the liquid crystal display device DSP according to the fifth embodiment and the driving method thereof as explained above, the liquid crystal display device DSP is formed in the same manner as the liquid crystal display device DSP according to the first embodiment. Therefore, in the fifth embodiment, the same advantages as in the first embodiment can be obtained.

Furthermore, in the fifth embodiment, in the case where the image part corresponding to the first pixel MP1 is short in green, the drive units can select a to-be-assigned subpixel or subpixels from among eight pixels MP surrounding the first pixel MP1, i.e., from not only four pixels MP adjacent to the first pixel MP1 in the first direction X and the second direction Y, but remaining four of the above eighth pixels MP. It is therefore increase the number of to-be-assigned subpixel or subpixels to be selected.

Even if for example, the fourth subpixel SP4 of the sixth pixel MP6 is selected as a to-be-assigned subpixel, it is possible to display desired green with a higher precision and increase the sharpness of the outline of a displayed image.

By virtue of the above structure, in the fifth embodiment, it is possible to obtain a liquid crystal display device DSP having a high display quality and a method of driving the liquid crystal display device DSP. Also, it is possible to obtain a liquid crystal display device DSP which has a high brightness and a high resolution and in which the degree of lowering of the sharpness is small and a driving method of the liquid crystal display device DSP.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the first direction X and the second direction Y are not limited to the directions defined with respect to the above embodiments, and can be variously changed. As shown by way of example in FIG. 15, in an X-Y plane in which the fifth pixel MP5 is located on an upper side, and the third pixel MP3 is located on a lower side, it may be defined that the first direction X is a direction toward the left, and the second direction Y is a direction toward the upper side. In another example, it may be defined that the first direction X is a direction toward the right, and the second direction Y is a direction toward the upper side. In still another example, it may be defined that the first direction X is a direction toward the left, and the second direction Y is a direction toward the lower side.

In the case where the entire display area DA contains at least one kind of pixels MP in which color displays made by the pixels MP are short in at least one of the first to third colors, with respect to each of the pixels MP, the drive units may randomly select one or two subpixels SP which display the above at least one of the first to third colors, as a to-be-assigned subpixel or subpixels, and which are included in eight pixels MP surrounding the above each of the pixels MP, and then adjust the voltage of an image signal to be supplied to the above to-be-assigned subpixel or subpixels. It is therefore possible to assign a display of the above at least one of the first to third colors to the to-be-assigned subpixel or subpixels.

For example, in a given area, a subpixel SP of a pixel MP located on a right side of the given area is selected as a to-be-assigned subpixel, and in another area, a subpixel SP of a pixel MP located on a lower side of the other area is selected as a to-be-assigned subpixel. Thereby, as compared with the case where only a subpixel SP of a pixel MP located adjacent to and rightward of a target pixel MP is selected, to-be-assigned subpixels are randomly selected, and moires appearing at regular intervals in an image can be reduced.

The liquid crystal display panel PNL according to each of the above embodiments has a structure adapted for the FFS mode used as a display mode; however, it may have a structure adapted for another display mode. For example, the liquid crystal display panel PNL may have a structure adapted for an in-plane switching (IPS) mode such as an FFS mode, which primarily utilizes a lateral electric field substantially parallel to a main surface of a substrate. In a display mode utilizing a lateral electric field, it is possible to apply a structure including, for example, an array substrate AR provided with pixel electrodes PE and a common electrode CE. Alternatively, a liquid crystal display panel PNL may have a structure adapted for a mode primarily utilizing a longitudinal electric field substantially perpendicular to the main surface of the substrate, such as a twisted nematic (TN) mode, an optically compensated bend (OCB) mode or a vertical aligned (VA) mode. In the display mode utilizing the longitudinal electric field, for example, it is possible to apply a structure including, for example, an array substrate AR provided with pixel electrodes PE and a counter-substrate CT provided with a common electrode CE. It should be noted that the main surface of the substrate is a surface which is parallel to an X-Y plane defined by first direction X and second direction Y orthogonal to each other.

Also, the above switching elements SW may be formed of single-gate thin-film transistors, not double-gate thin-film transistors.

With respect to each of the above embodiments, as the display device, liquid crystal display device has been described by way of example. However, the above embodiments are applicable to all kinds of flat-panel display devices, such as organic electroluminescent (EL) display devices, self-luminous display devices, electronic paper-type display devices including electrophoresis elements, etc. The above embodiments can be applied to middle or small display devices and large display devices without particular limitation. Moreover, the above embodiments can be applied to various types of display devices and driving methods thereof.

What is claimed is:

1. A display device comprising:
a plurality of signal lines arranged in a first direction;
a plurality of scanning lines arranged in a second direction crossing the first direction;
a first pixel including a first subpixel, a second subpixel and a third subpixel, the first subpixel including a first region which displays a first color different from white, the second subpixel including a second region which displays white, the second subpixel being located forward of the first subpixel in the second direction and adjacent to the first subpixel, the third subpixel including a third region which displays a second color different from white and the first color, the third subpixel being located forward of the first subpixel and the second subpixel in the first direction and adjacent to the first and second subpixels;
a second pixel including a fourth subpixel, a fifth subpixel and a sixth subpixel, the fourth subpixel including a fourth region which displays a third color different from white, the first color and the second color, the fifth subpixel including a fifth region which displays white, the fifth subpixel being located forward of the fourth subpixel in the second direction and adjacent to the fourth subpixel, the sixth subpixel including a sixth region which displays the first color, the sixth subpixel being located forward the fourth subpixel and the fifth subpixel in the first direction and adjacent to the fourth subpixel and the fifth subpixel, the second pixel being adjacent to the first pixel on a side of the first pixel; and
a third pixel including a seventh subpixel, an eighth subpixel and a ninth subpixel, the seventh subpixel including a seventh region which displays the second color, the eighth subpixel including an eighth region which displays white, the eighth subpixel being located forward of the seventh subpixel in the second direction and adjacent to the seventh subpixel, the ninth subpixel including a ninth region which displays the third color, the ninth subpixel being located forward of the seventh subpixel and the eighth subpixel in the first direction and adjacent to the seventh and eighth subpixels, the third pixel being adjacent to the first pixel on another side of the first pixel.

2. The display device of claim 1, further comprising:
a driving unit which drives the signal lines and the scanning lines, and supplies image signals to the first subpixel to ninth subpixel of the first to third pixels through the signal lines,
wherein
in a case where a color display made by the first pixel is short in the third color, the driving unit adjusts a voltage of an image signal, which is to be supplied to a to-be-assigned subpixel or subpixels which are one or two subpixels which display the third color, and are included in the second pixel and the third pixel, and assigns a display of the third color in which the color display is short to the to-be-assigned subpixel or subpixels.

3. The display device of claim 1, wherein
an area of each of the third region, the sixth region and the ninth region is greater than an area of each of the first region, the second region, the fourth region, the fifth region, the seventh region and the eighth region.

4. The display device of claim 3, further comprising:
a driving unit which drives the signal lines and the scanning lines, and supplies image signals to the first subpixel to ninth subpixel of the first to third pixels through the signal lines,
wherein
in a case where a color display made by the first pixel is short in the third color, the driving unit determines whether a display of the third color in which the color display is short is allowed to be supplemented with the fourth subpixel or not,
when the drive unit determines that the display of the third color is allowed to be supplemented with the fourth subpixel, the drive unit adjusts a voltage of an image signal, which is to be supplied to the fourth subpixel, and assigns the display of the third color to the fourth subpixel, and
when the drive unit determines that the display of the third color is not allowed to be supplemented with the fourth subpixel, the drive unit adjusts a voltage of an image signal, which is to be supplied to the ninth subpixel, and assigns the display of the third color to the ninth subpixel.

5. The display device of claim 1, further comprising:
a fourth pixel formed to have the same structure as the third pixel, the fourth pixel being adjacent to the first pixel on a further side of the first pixel, and located along with the first and second pixels in line abreast in the first direction;
a fifth pixel formed to have the same structure as the second pixel, the fifth pixel being adjacent to the first pixel on still another side of the first pixel, and located along with the first and third pixels in line abreast in the second direction; and
a drive unit which drives the signal lines and the scanning lines, and supplies image signals to the first to ninth subpixels of the first to fifth pixels through the signal lines,
wherein
in a case where a color display made by the first pixel is short in the third color, the drive unit adjusts a voltage of an image signal to be supplied to one or more to-be-assigned subpixels, which display the third color, and are included in the second to fifth pixels, and assigns a display of the third color in which the color display is short to the to-be-assigned subpixel or subpixels.

6. The display device of claim 1, further comprising:
a fourth pixel formed to have the same structure as the third pixel, the fourth pixel being adjacent to the first pixel on a further side of the first pixel, and located along with the first and second pixels in line abreast in the first direction;

a fifth pixel formed to have the same structure as the second pixel, the fifth pixel being adjacent to the first pixel on still another side of the first pixel, and located along with the first and third pixels in line abreast in the second direction;

a sixth pixel formed to have the same structure as the second pixel, the sixth pixel being adjacent to the fourth pixel on a side of the fourth pixel, and adjacent to the third pixel on a side of the third pixel;

a seventh pixel formed to have the same structure as the third pixel, the seventh pixel being adjacent to the second pixel on a side of the second pixel, and adjacent to the fifth pixel on a side of the fifth pixel; and an eighth pixel formed to have the same structure as the first pixel, the eighth pixel being adjacent to the second pixel on another side of the second pixel, and adjacent to the third pixel on another side of the third pixel, the eighth pixel being located along with the third and sixth pixels in line breast in the first direction; and a ninth pixel formed to have the same structure as the first pixel, the ninth pixel being adjacent to the fourth pixel on another side of the fourth pixel, and adjacent to the fifth pixel on another side of the fifth pixel, the ninth pixel being located along with the fifth and seventh pixels in line abreast in the first direction.

7. The display device of claim 6, further comprising:
a driving unit which chives the signal lines and the scanning lines, and supplies image signals to the first to ninth subpixels of the first to ninth pixels through the signal lines,
wherein
in a case where a color display made by the first pixel is short in the third color, the driving unit adjusts a voltage of an image signal, which is to be supplied to a to-be-assigned subpixel or subpixels which are one or two subpixels which display the third color, and are included in the second to the ninth pixels, and assigns a display of the third color in which the color display is short to the to-be-assigned subpixel or subpixels.

8. The display device of claim 7, wherein
the drive unit randomly selects the to-be-assigned subpixel or subpixels from among the second to ninth pixels.

9. The display device of claim 6, further comprising:
a plurality of pixel groups arranged in the first and second directions; and
a drive unit which drives the signal lines and the scanning lines, and supplies image signals to the first to ninth subpixels of the first to ninth pixels through the signal lines;
wherein
each of the pixel groups includes a plurality of kinds of pixels which are identical to the first to ninth pixels,
in a case where in an entire display area, at least one kind of pixels are present in which a color display made by each of the pixels is short in at least one of the first to third colors, the drive unit randomly selects a to-be-assigned subpixel or subpixels which are one or two subpixels which display the at least one of the first to third colors, and are included in eight pixels surrounding the each of the pixels, adjusts a voltage of an image signal, which is to be supplied to the to-be-assigned subpixel or subpixels, and assigns a display of the at least one of the first to third colors to the to-be-assigned subpixel or subpixels.

10. The display device of claim 6, further comprising:
a driving unit which drives the signal lines and the scanning lines, and supplies image signals to the first to ninth subpixels of the first to ninth pixels through the signal lines,
wherein
in a case where the third color is displayed in a target area, the first pixel is located in an outer edge portion of the target area, and a color display made by the first pixel is short in the third color, the driving unit determines whether the color display made by the first pixel is allowed to be supplemented with one or two subpixels which display the third color, and are included in the second to the ninth pixels and located in the target area, and
in a case where the driving unit determines that the color display is allowed to be supplemented with the one or two subpixels, the driving unit adjusts a voltage of an image signal to be supplied to a to-be-assigned subpixel or subpixels which are the one or two subpixels, and assigns a display of the third color to the to-be-assigned subpixel or subpixels.

11. The display device of claim 10, wherein
in a case where the driving unit determines that the color display is not allowed to be supplemented with the one or two subpixels, the driving unit does not assign the display of the third color to any of sub-pixels of the second to ninth pixels, which display the third color.

12. A method of driving a display device which comprising:
a plurality of signal lines arranged in a first direction;
a plurality of scanning lines arranged in a second direction crossing the first direction;
a first pixel including a first subpixel, a second subpixel and a third subpixel, the first subpixel including a first region which displays a first color different from white, the second subpixel including a second region which displays white, the second subpixel being located forward of the first subpixel in the second direction and adjacent to the first subpixel, the third subpixel including a third region which displays a second color different from white and the first color, the third subpixel being located forward of the first subpixel and the second subpixel in the first direction and adjacent to the first and second subpixels;
a second pixel including a fourth subpixel, a fifth subpixel and a sixth subpixel, the fourth subpixel including a fourth region which displays a third color different from white, the first color and the second color, the fifth subpixel including a fifth region which displays white, the fifth subpixel being located forward of the fourth subpixel in the second direction and adjacent to the fourth subpixel, the sixth subpixel including a sixth region which displays the first color, the sixth subpixel being located forward the fourth subpixel and the fifth subpixel in the first direction and adjacent to the fourth subpixel and the fifth subpixel, the second pixel being adjacent to the first pixel on a side of the first pixel; and
a third pixel including a seventh subpixel, an eighth subpixel and a ninth subpixel, the seventh subpixel including a seventh region which displays the second color, the eighth subpixel including an eighth region which displays white, the eighth subpixel being located forward of the seventh subpixel in the second direction and adjacent to the seventh subpixel, the ninth subpixel including a ninth region which displays the third color, the ninth subpixel being located forward of the seventh subpixel and the eighth subpixel in the first direction and adjacent to the seventh and eighth subpixels, the third pixel being adjacent to the first pixel on another side of the first pixel, the method comprising:

driving the signal lines and the scanning lines, and supplying image signals to the first to ninth subpixels of the first to third pixels through the signal lines, and adjusting, in a case where a color display made by the first pixel is short in the third color, a voltage of an image signal to be supplied to a to-be-assigned subpixel or subpixels which are one or two subpixels which display the third color, and are included in the second and third pixels, and assigning a display of the third color in which the color display is short to the to-be-assigned subpixel or subpixels.

* * * * *